United States Patent
Irvin, Sr.

(10) Patent No.: US 12,145,449 B2
(45) Date of Patent: Nov. 19, 2024

(54) COLLECTOR PLATE FOR USE WITH A DISK-PACK TURBINE SYSTEM

(71) Applicant: QWTIP LLC, Park City, UT (US)

(72) Inventor: Whitaker Ben Irvin, Sr., Kamas, UT (US)

(73) Assignee: QWTIP LLC, Park City, UT (US)

( * ) Notice: Subject to any disclaimer, the term of this patent is extended or adjusted under 35 U.S.C. 154(b) by 879 days.

(21) Appl. No.: 17/073,325

(22) Filed: Oct. 17, 2020

(65) Prior Publication Data

US 2021/0101487 A1  Apr. 8, 2021

Related U.S. Application Data

(63) Continuation of application No. 15/881,758, filed on Jan. 27, 2018, now Pat. No. 10,807,478, which is a (Continued)

(51) Int. Cl.
| | |
|---|---|
| *B60L 13/04* | (2006.01) |
| *B01D 45/14* | (2006.01) |
| *F03G 7/00* | (2006.01) |
| *F04D 5/00* | (2006.01) |
| *H02N 15/00* | (2006.01) |
| *B03C 3/00* | (2006.01) |
| *B60L 13/08* | (2006.01) |

(52) U.S. Cl.
CPC .............. *B60L 13/04* (2013.01); *B01D 45/14* (2013.01); *F03G 7/00* (2013.01); *F04D 5/001* (2013.01); *H02N 15/00* (2013.01); *B03C 3/00* (2013.01); *B60L 13/08* (2013.01); *B60L 2200/26* (2013.01)

(58) Field of Classification Search
CPC ...... B60L 13/04; B60L 13/08; B60L 2200/26; B01D 45/14; F03G 7/00; F04D 5/001; H02N 15/00; B03C 3/00
See application file for complete search history.

(56) References Cited

U.S. PATENT DOCUMENTS

| | | |
|---|---|---|
| 699,636 A | 5/1902 | Thrupp |
| 1,061,206 A | 5/1913 | Tesla |
| | (Continued) | |

FOREIGN PATENT DOCUMENTS

| | | |
|---|---|---|
| AT | 196680 | 3/1958 |
| DE | 1453730 A1 | 4/1970 |
| | (Continued) | |

OTHER PUBLICATIONS

Coats, Callum, "Living Energies," 2001, pp. 107-117, 156-192, 197-200, and 275-293.
(Continued)

*Primary Examiner* — Zachary L Kuhfuss
(74) *Attorney, Agent, or Firm* — Cahn & Samuels, LLP

(57) ABSTRACT

A system and method in at least one embodiment provides magnetic levitation to a vehicle above and/or partially about a rail or track using a flux field generator having a plurality of members having mated waveform patterns. In a further embodiment, the magnetic levitation also uses a distribution system. In a further embodiment, the plurality of members forms a disk-pack turbine. In a further embodiment, the flux field generator is not vehicle based.

20 Claims, 18 Drawing Sheets

Related U.S. Application Data continuation of application No. 14/473,544, filed on Aug. 29, 2014, now Pat. No. 9,878,636, which is a continuation of application No. PCT/US2013/028432, filed on Feb. 28, 2013.

(60) Provisional application No. 61/605,177, filed on Feb. 29, 2012, provisional application No. 61/605,683, filed on Mar. 1, 2012.

(56) References Cited

U.S. PATENT DOCUMENTS

| | | | | |
|---|---|---|---|---|
| 1,383,937 | A | 7/1921 | Guthrie | |
| 2,087,834 | A | 7/1937 | Brown et al. | |
| 2,514,039 | A | 7/1950 | Downward | |
| 2,601,519 | A * | 6/1952 | Hardy | B01D 47/16 96/267 |
| 3,487,784 | A | 1/1970 | Rafferty et al. | |
| 3,632,221 | A | 1/1972 | Uehling | |
| 3,664,268 | A * | 5/1972 | Lucas | B61B 13/08 104/286 |
| 3,731,800 | A | 5/1973 | Timson | |
| 4,042,351 | A | 8/1977 | Anderson | |
| 4,118,207 | A | 10/1978 | Wilhelm | |
| 4,186,554 | A | 2/1980 | Possell | |
| 4,201,512 | A | 5/1980 | Marynowski et al. | |
| 4,350,236 | A | 9/1982 | Stahluth | |
| 4,361,490 | A | 11/1982 | Saget | |
| 4,371,382 | A | 2/1983 | Ross | |
| 5,146,853 | A * | 9/1992 | Suppes | B60L 15/005 104/282 |
| 5,215,501 | A | 6/1993 | Ushikoski | |
| 5,248,238 | A | 9/1993 | Ishida et al. | |
| 5,254,250 | A | 10/1993 | Rolchigo et al. | |
| 5,498,329 | A | 3/1996 | Lamminen et al. | |
| 5,744,004 | A | 4/1998 | Ekholm et al. | |
| 5,769,069 | A | 6/1998 | Caffell | |
| 5,778,695 | A | 7/1998 | Conner | |
| 6,116,420 | A | 9/2000 | Horton | |
| 6,135,708 | A * | 10/2000 | Conrad | F04D 17/161 415/182.1 |
| 6,227,795 | B1 * | 5/2001 | Schmoll, III | F01D 1/36 415/198.1 |
| 6,328,527 | B1 | 12/2001 | Conrad et al. | |
| 6,517,309 | B1 | 2/2003 | Zaher | |
| 6,682,077 | B1 | 1/2004 | Letourneau | |
| 6,692,232 | B1 | 2/2004 | Letourneau | |
| 6,719,817 | B1 | 4/2004 | Marin | |
| 6,873,235 | B2 | 3/2005 | Fiske et al. | |
| 6,890,443 | B2 | 5/2005 | Adams | |
| 7,074,008 | B2 | 7/2006 | Motonaka | |
| 7,341,424 | B2 | 11/2008 | Dial | |
| 7,462,945 | B2 | 12/2008 | Baarmann | |
| 7,489,060 | B2 | 2/2009 | Qu et al. | |
| 8,623,212 | B2 | 1/2014 | Irvin, Sr. et al. | |
| 8,636,910 | B2 | 1/2014 | Irvin, Sr. et al. | |
| 8,784,035 | B2 * | 7/2014 | Blackstone | F04D 29/2222 415/206 |
| 9,469,553 | B2 | 10/2016 | Irvin, Sr. | |
| 9,474,991 | B2 | 10/2016 | Irvin, Sr. | |
| 9,605,563 | B2 | 3/2017 | Chardonnet et al. | |
| 9,605,663 | B2 | 3/2017 | Irvin, Sr. | |
| 9,707,495 | B2 | 7/2017 | Irvin, Sr. | |
| 9,714,176 | B2 | 7/2017 | Irvin, Sr. | |
| 9,714,716 | B2 | 7/2017 | Cefai | |
| 9,878,636 | B2 * | 1/2018 | Irvin, Sr. | F04D 5/001 |
| 10,463,993 | B2 | 11/2019 | Irvin, Sr. | |
| 10,464,824 | B2 | 11/2019 | Irvin, Sr. | |
| 10,576,398 | B2 | 3/2020 | Irvin, Sr. | |
| 10,682,653 | B2 | 6/2020 | Irvin, Sr. | |
| 10,790,723 | B2 * | 9/2020 | Irvin, Sr. | B03C 3/00 |
| 10,807,478 | B2 * | 10/2020 | Irvin, Sr. | B60L 13/04 |
| 11,339,767 | B2 * | 5/2022 | Irvin, Sr. | F03G 7/00 |
| 2002/0195862 | A1 | 12/2002 | Kelly et al. | |
| 2003/0106858 | A1 | 6/2003 | Elsom Sharpe | |
| 2004/0009063 | A1 | 1/2004 | Polacsek | |
| 2004/0159085 | A1 | 8/2004 | Carlsson et al. | |
| 2004/0107681 | A1 | 10/2004 | Carlsson et al. | |
| 2005/0019154 | A1 | 1/2005 | Dial | |
| 2006/0000383 | A1 | 1/2006 | Nast | |
| 2006/0054549 | A1 | 3/2006 | Schoendorfer | |
| 2006/0233647 | A1 | 10/2006 | Saunders | |
| 2006/0272624 | A1 | 12/2006 | Pettersson | |
| 2007/0089636 | A1 * | 4/2007 | Guardo | B60L 13/10 104/281 |
| 2007/0144956 | A1 | 6/2007 | Park et al. | |
| 2008/0067813 | A1 | 3/2008 | Baarmanst | |
| 2008/0168899 | A1 | 7/2008 | Decker | |
| 2009/0078150 | A1 | 3/2009 | Hasegawa et al. | |
| 2009/0200129 | A1 | 8/2009 | Houle et al. | |
| 2009/0283007 | A1 | 11/2009 | Taylor | |
| 2009/0314161 | A1 | 12/2009 | Al-Alusi et al. | |
| 2010/0107647 | A1 | 5/2010 | Bergen | |
| 2010/0180854 | A1 | 7/2010 | Baumann et al. | |
| 2011/0038707 | A1 | 2/2011 | Blackstone | |
| 2011/0266811 | A1 | 11/2011 | Smadja | |
| 2011/0285234 | A1 | 11/2011 | Jang | |
| 2012/0051908 | A1 * | 3/2012 | Irvin, Sr. | B01D 47/16 416/1 |
| 2014/0070541 | A1 * | 3/2014 | Irvin, Sr. | B03C 3/00 290/52 |
| 2014/0183144 | A1 | 7/2014 | Irvin, Sr. | |
| 2015/0151649 | A1 * | 6/2015 | Leung | H02K 7/1869 104/282 |
| 2016/0257220 | A1 * | 9/2016 | Irvin, Sr. | B01D 45/14 |
| 2018/0003163 | A1 * | 1/2018 | Irvin, Sr. | F04D 5/001 |
| 2019/0039478 | A1 * | 2/2019 | Irvin, Sr. | F04D 5/001 |
| 2021/0067000 | A1 * | 3/2021 | Irvin, Sr. | B04B 1/04 |
| 2023/0065304 | A1 * | 3/2023 | Irvin, Sr. | B04B 1/04 |

FOREIGN PATENT DOCUMENTS

| Country | Number | | Date |
|---|---|---|---|
| EP | 0101770 | A1 | 3/1984 |
| EP | 1898100 | A1 | 8/2006 |
| EP | 1770717 | A1 | 4/2007 |
| GB | 1063096 | | 3/1967 |
| GB | 1187632 | | 4/1970 |
| GB | 1262961 | | 2/1972 |
| JP | 2009273967 | A | 11/2009 |
| JP | 2009276330 | A | 11/2009 |
| JP | 2009293984 | A | 11/2009 |
| SU | 1625829 | A1 | 2/1991 |
| WO | 96/41082 | A1 | 12/1996 |
| WO | 2004112938 | A1 | 12/2004 |
| WO | 2008054131 | A1 | 5/2008 |
| WO | 2009010248 | A2 | 1/2009 |
| WO | 2009024154 | A1 | 2/2009 |
| WO | 2009109020 | A1 | 9/2009 |
| WO | 2010/085044 | A2 | 7/2010 |
| WO | 2013/029001 | A1 | 2/2013 |

OTHER PUBLICATIONS

Schauberger, Viktor, translated and edited by Callum Coats, "The Energy Evolution: Harnessing Free Energy from Nature," vol. 4 of the Eco-Technology Series, Mar. 2001, pp. 9-28, 62-63, 104-113, 130-142, 164-195, and 200-203.

Schauberger, Viktor, translated and edited by Callum Coats, "The Fertile Earth: Nature's Energies in Agriculture, Soil Fertilisation and Forestry," Volume Three of Eco-Technology Series, Mar. 2001, pp. 26-29, 39-43, 48-50, 57-68, and 72-74.

Guardian Trader, Genesis Vortex, http://guardiantrader.com/Genesis_Vortex.html, printed Jul. 12, 2011.

Natural Energy Works, "Wasserwirbler (Water Vortex Shower)", http://www.orgonclab.org/cart/yvortex.htm, printed Jul. 12, 2011.

Wikipedia, "Tesla Turbine," http://en.wikipedia.org/wiki/Tesla_turbine, printed Mar. 23, 2010.

Jens Fischer, "Original Martin-Wirbelwasser", http://fischer-wirbelwasser.de/Schauberger/schauberger.html, printed Jul. 12, 2011.

(56) References Cited

OTHER PUBLICATIONS

Wirbelwasser, "Was ist Wirbelwasser?", http://fischer-wirbelwasser.de/Wasserwirbler/Was_ist_Wirbelwasser/body_was_ist_wirbelwasser.html, printed Jul. 12, 2011.

European Patent Office, English Abstract for JP2009293984 (A), printed Mar. 14, 2013.

Fractal Water, LLC, "Structured Water is Fractal Water's Implosion Nozzle Vortex", copyrighted 2012, printed on Dec. 28, 2012 from http://www.fractalwater.com/vortex/.

Fractal Water, LLC, "Magnetic Water Treatment with the Fractal Water Super Imploder Magnetics", copyrighted 2012, printed on Dec. 28, 2012 from http://www.fractalwater.com/magnetics/.

Fractal Water, LLC, "Fractal Water: Vortex Magnetic Systems:: Physics of the Imploder Vortex Nozzle", copyrighted 2012, printed on Dec. 28, 2012 from http://www.fractalwater.com/science/physics-of-the-imploder-vortex-nozzle/.

Fractal Water, LLC, "Buy the Super Imploder from Fractal Water, Vortex Magnetic System", copyrighted 2012, printed on Dec. 28, 2012 from http://www.fractalwater.com/products/imploder-magnetic-water/.

Fractal Water, LLC, "Implosion Water Structured Vortex", copyrighted 2012, printed on Dec. 28, 2012 from http://www.fractalwater.com/products/tri-ploder-vortex/.

Fractal Water, LLC, "Fractal Water: Vortex Magnetic Systems :: Imploder Vortex Shower Head", copyrighted 2012, printed on Dec. 28, 2012 from http://www.fractalwater.com/products/imploder-vortex-shower-head/.

WIPO PCT International Preliminary Report on Patentability, PCT/US2012/052336, issued Feb. 25, 2014.

United States Patent and Trademark Office, U.S. Appl. No. 15/295,732 Office Action, dated Mar. 19, 2019.

European Patent Office, Communication pursuant to Article 94(3) EPC in EP Application No. 11 820 579.8, Aug. 29, 2019.

European Patent Office, English Machine Translation of SU1625829, printed Jan. 24, 2019.

European Patent Office, English Abstract for JP2009276330 (A), printed Mar. 14, 2013.

European Patent Office, English Abstract for JP2009273967 (A), printed Mar. 14, 2013.

\* cited by examiner

| First Test Run | | |
|---|---|---|
| Drive Motor Measurements | First Read | End Read |
| Voltage | 84.3 | 84.1 |
| Amperage | 9.53 | 8.62 |
| Watts | 811.8 | 724.9 |
| Turbine RPM | 1127 | 1127 |
| | | |
| Output Measurements | First Read | End Read |
| Voltage | 120.2 | 122.2 |
| Amperage | 17.2 | 15.8 |
| Watts | 2107 | 1930 |
| | | |
| Load Measurements | First Read | End Read |
| Voltage | 120.2 | 122.2 |
| Amperage | 1.1 | 1.1 |
| Watts | 132.4 | 134.4 |
| Turbine RPM | 2248 | 2302 |
| | Pre-Run | Post-Run |
| Net Standing Battery Bank | 115.3 V | 116.6 V |
| 1 HP DC motor temperature | 95.7 F | 90.7 F |
| room temperature | 70.8 F | |

FIG. 25A

| Second Test Run | | |
|---|---|---|
| Drive Motor Measurements | First Read | End Read |
| Voltage | 82.5 | 82.5 |
| Amperage | 10.17 | 9.74 |
| Watts | 842.5 | 811.3 |
| Turbine RPM | 1076 | 1080 |
| | | |
| Output Measurements | First Read | End Read |
| Voltage | 113.6 | 113.4 |
| Amperage | 9.4 | 3.6 |
| Watts | 1067.84 | 407.1 |
| | | |
| Load Measurements | First Read | End Read |
| Voltage | 112.6 | 113.4 |
| Amperage | 8.3 | 7.4 |
| Watts | 952.8 | 879.6 |
| Turbine RPM | N/A | N/A |
| | Pre-Run | Post-Run |
| Net Standing Battery Bank | 115.7 V | 116.3 V |
| 1.5 HP drive motor temperature | 90.1 F | 87.8 F |
| room temperature | 67.8 F | |

FIG. 25B

| Third Test Run | | |
|---|---|---|
| Drive Motor Measurements | First Read | End Read |
| Voltage | 83.6 | 83.5 |
| Amperage | 8.59 | 8.28 |
| Watts | 715.6 | 691.3 |
| Turbine RPM | 1107 | 1113 |
| | | |
| Output Measurements | First Read | End Read |
| Voltage | 119.8 | 121 |
| Amperage | 16.5 | 15.4 |
| Watts | 1976.7 | 1863.4 |
| | | |
| Load Measurements | First Read | End Read |
| Voltage | 119.6 | 121.4 |
| Amperage | 0.9 | 0.9 |
| Watts | 107.9 | 108.9 |
| Turbine RPM | N/A | N/A |
| | Pre-Run | Post-Run |
| Net Standing Battery Bank | 115.3 V | 116.1 V |
| 1.5 HP drive motor temperature | 85.6 F | 83.8 F |
| room temperature | 69.8 F | |

FIG. 25C

| Item | Original Run Time | Run Time - Test 1 | Run Time - Test 2 | Run Time - Test 3 |
|---|---|---|---|---|
| PlayBook 1 | 5.3 | 5.4 | 9.55 | 6.9 |
| PlayBook 2 | 5.3 | 6.75 | 7.98 | 6.3 |

FIG. 26

COLLECTOR PLATE FOR USE WITH A DISK-PACK TURBINE SYSTEM

This application is a continuation application from U.S. application Ser. No. 15/881,758, filed Jan. 27, 2018 and issued as U.S. Pat. No. 10,807,478 on Oct. 20, 2020, which was a continuation application from U.S. application Ser. No. 14/473,544, filed Aug. 29, 2014 and issued as U.S. Pat. No. 9,878,636 on Jan. 30, 2018, which was a continuation application from PCT Application No. PCT/US2013/028432, filed Feb. 28, 2013, which claims the benefit of U.S. provisional Application Ser. No. 61/605,177, filed Feb. 29, 2012, and entitled System and Method for Levitation; U.S. provisional Application No. 61/605,683, filed Mar. 1, 2012, and entitled Levitation and Distribution System and Method, which are hereby each incorporated by reference.

I. FIELD OF THE INVENTION

The present invention in at least one embodiment relates to a system and method for creation of a repulsive field with a flux field generator to provide levitation to a vehicle or platform above a rail and/or track. In another embodiment, the invention relates to the transmission of diamagnetic fields. In a further embodiment, the invention relates to a method for charging batteries.

II. BACKGROUND OF THE INVENTION

Current magnetic levitation (maglev) trains use some combination of magnets, specialized rails, cooling systems, and batteries to suspend, guide and/or propel vehicles such as trains along a fixed path. Some existing systems utilize wheels for low speed and/or stopping the vehicle to avoid the train crashing down on the rails.

III. SUMMARY OF THE INVENTION

In at least one embodiment, the invention provides a levitation system including: at least one flux field generator having at least one inlet (or intake chamber or a vortex chamber), a disk-pack turbine having an expansion chamber axially centered and in fluid communication with the at least one inlet, wherein the disk-pack turbine includes members having waveforms formed on at least one surface, and a drive system engaging the disk-pack turbine; and at least one rail or track including magnetic material and/or electromagnets.

In at least one embodiment, the invention includes a levitation system including: at least one flux field generator having a disk-pack turbine having at least one waveform member having waveforms formed on at least one surface, and a drive system engaging the disk-pack turbine; and at least one rail or track including magnetic material and/or electromagnets.

In a further embodiment to any of the above embodiments, the system further includes a distribution system in flux communication with the at least one flux field generator; and in a further embodiment the distribution system includes a matrix having a plurality of structure members and/or cables with a plurality of free ends proximate to distribution points, and in a further embodiment at least one of a battery bank and a capacitor bank connected to the matrix. In a further embodiment, the delivery free ends include a field delivery shield including at least one of the following materials individually, as part of an alloy and/or in layers: copper, bismuth, steel, iron, silver, nickel, gold, platinum, carbon-fiber structures, and mercury. In a further embodiment to any of the previous embodiments, the system further includes a flux return located at least above the disk-pack turbine and/or a flux return housing shrouding a top and side of the disk-pack turbine. In a further embodiment, the flux return includes at least one of material selected from a group consisting of bismuth, copper, iron and steel and/or includes laminating layers of material. In a further embodiment to any of the previous embodiments, the flux field generator further includes a containment area defined by a containment wall and a flux plate connected to the containment wall where the flux plate is located above the plurality of waveform disks. In a further embodiment to any of the previous embodiments, the flux field generator further includes a plurality of collectors spaced evenly around the periphery of the plurality of waveform disks. In a further embodiment to any of the previous embodiments, the flux field generator further includes a first coil array placed on a first side of the disk-pack turbine and around the at least one inlet, an array of magnets in magnetic communication with the disk-pack turbine and centered about the at least one inlet; and the inlet includes a conduit running into the disk-pack turbine. In a further embodiment, the system further includes an electrical distribution system connected to the first coil array. In a further embodiment to any of the previous embodiments, the waveforms are hyperbolic, which in a further embodiment are selected from the group consisting of biaxial and multiaxial sinusoidal waveforms. In a further embodiment to any of the previous embodiments, the waveform members include at least one pair of mated disks, the mated disks are substantially parallel to each other, each disk having a top surface, a bottom surface, a waveform pattern on at least one surface of the disk facing at least one neighboring disk such that a passageway is formed by the neighboring waveform patterns of the neighboring disks in the pair of mated disks, at least one mated disk in each pair of mated disks includes at least one opening passing through its height, and a fluid pathway exists for directing fluid from the at least one opening in the disks through the at least one passageway towards the periphery of the disks; and each of the waveform patterns includes a plurality of at least one of protrusions and depressions. In a further embodiment to any of the previous embodiments, the waveform members includes a top rotor attached to one surface without the waveform pattern of one mated disk, and a bottom rotor attached to one surface without the waveform pattern of another mated disk from a second pair of mated disks. In a further embodiment to any of the previous embodiments, the system further includes 1) a vehicle having at least two of the flux field generators where one is positioned proximate to the front of the vehicle and the second is positioned proximate to the rear of the vehicle, or 2) a vehicle having at least four of the flux field generators where two are positioned proximate to the front of the vehicle and the other two are positioned proximate to the rear of the vehicle such that each pair is positioned to be perpendicular to the rail and 45 degrees to a surface on which the rail is located. In a further embodiment to any of the previous embodiments, the at least one rail or track is laid out in a pattern on a floor or other support surface. In a further embodiment to any of the previous embodiments, the system further includes two positioning rails running substantially parallel to the at least one rail; and wherein the two positioning rails are capable of interacting magnetically with the at least one flux field generator. In a further embodiment, the system further includes a vehicle having at least four of the flux field generators where two are positioned proximate to the front of the vehicle and the other two are positioned proximate to the rear of the vehicle such that each pair is positioned to be perpendicular to the rail and 45 degrees to a surface on which the rail is located with their lower end pointing at one of the two positioning rails. In a further embodiment to any of the previous non-vehicle embodiments, the system further includes a vehicle having at least four of the flux field generators where two are positioned proximate to the front of the vehicle and the other two are positioned proximate to the rear of the vehicle; and wherein the at least one rail includes two rails, and each pair of flux field generators is positioned to be perpendicular to the rail and 45 degrees to a surface on which the rail is located with their lower end pointing at one of the two positioning rails.

In at least one embodiment, the invention includes a method of operation of a flux field generator having a disk-pack turbine with rotors and/or disk(s) having waveforms on them to create a magnetic field to levitate a vehicle above a track and/or rail.

In at least one embodiment, the invention includes a method for levitating a vehicle including rotating a disk-pack turbine having a plurality of rotors and/or disks that together include at least two opposing surfaces with waveforms around an expansion chamber to define at least one chamber; and directing the magnetic field generated by rotation of the disk-pack turbine through a distribution system towards at least one electromagnet to provide repulsion between the vehicle and the at least one electromagnet.

In at least one embodiment, the invention includes a method for levitating a vehicle including: rotating a disk-pack turbine having a plurality of waveform members that together include at least two opposing surfaces with waveforms around an expansion chamber to define at least one chamber; and directing the magnetic field generated by rotation of the disk-pack turbine through a distribution system towards at least one electromagnet to provide repulsion between the vehicle and the at least one electromagnet.

In at least one embodiment, the invention includes a method for levitating a vehicle including: rotating a disk-pack turbine having a plurality of waveform members that together include at least two opposing surfaces with waveforms around an axial center of the waveform members; and directing the magnetic field generated by rotation of the disk-pack turbine towards at least one electromagnet to provide repulsion between the disk-pack turbine and the at least one electromagnet.

In a further embodiment to any of the above method embodiments, the method further includes generating a current within a plurality of coil arrays with the disk-pack turbine and at least one magnet. In a further embodiment to any of the above method embodiments, the method further includes distributing the current to other parts of the vehicle or other connected vehicles. In a further embodiment to any of the above method embodiments, the method further includes laterally positioning the vehicle between two rails. In a further embodiment to any of the above method embodiments, the method further includes decreasing the speed of rotation of the disk-pack turbine to lower the vehicle to a surface over which the vehicle is levitating. In a further embodiment to any of the above method embodiments, the method further includes storing the diamagnetic field in a battery bank and/or a capacitor bank.

In at least one embodiment, the invention includes a method for conditioning batteries including: rotating a disk-pack turbine having a plurality of waveform members that together include at least two opposing surfaces with waveforms around an expansion chamber to define at least one chamber to generate a magnetic field; generating current within a plurality of coils located between the plurality of waveform members and at least one magnet plate to produce alternating current in response to the magnetic field; distributing the alternating current to a plurality of rechargeable batteries; disconnecting the rechargeable batteries; using the energy stored in the rechargeable batteries; and repeating the above steps at least once. In a further embodiment, the method further includes charging the rechargeable batteries using wall power.

IV. BRIEF DESCRIPTION OF THE DRAWINGS

The present invention is described with reference to the accompanying drawings. In the drawings, like reference numbers indicate identical or functionally similar elements. The use of cross-hatching and shading within the drawings is not intended as limiting the type of materials that may be used to manufacture the invention.

FIGS. 25A-25C are tables of data collected as part of testing electrical power generation.

FIG. 26 is a table of data collected as part of testing battery charging.

Figure 1:
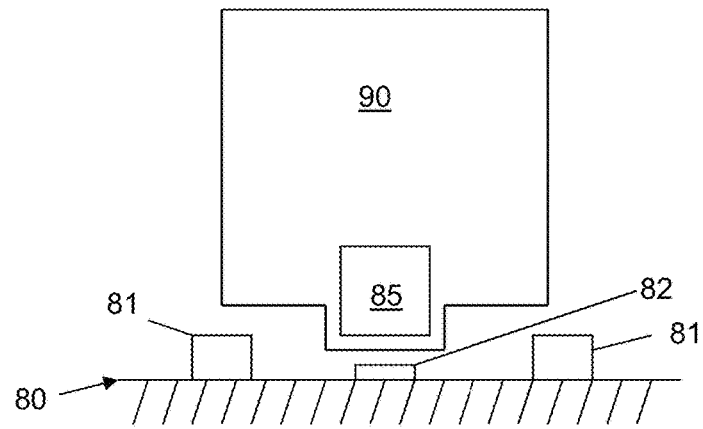
FIG. 1 illustrates a block diagram according to the invention.

Given the following enabling description of the drawings, the invention should become evident to a person of ordinary skill in the art.

V. DETAILED DESCRIPTION OF THE DRAWINGS

A. Definitions

In this disclosure, waveforms include, but are not limited to, circular, sinusoidal, biaxial, biaxial sinucircular, a series of interconnected scallop shapes, a series of interconnected arcuate forms, hyperbolic, and/or multi-axial including combinations of these that when rotated provide progressive, disk channels with the waveforms being substantially centered about an axial center of the disk and/or an expansion chamber. The waveforms are formed, for example but not limited to, by a plurality of ridges (or protrusions or rising waveforms), grooves, and depressions (or descending waveforms) in the waveform surface including the features having different heights and/or depths compared to other features and/or along the individual features. In some embodiments, the height in the vertical axis and/or the depth measured along a radius of the disk chambers vary along a radius as illustrated, for example, in FIG. 15D. In some embodiments, the waveforms are implemented as ridges that have different waveforms for each side (or face) of the ridge. In this disclosure, waveform patterns (or geometries) are a set of waveforms on one disk surface. Neighboring rotor and/or disk surfaces have matching waveform patterns that form a channel running from the expansion chamber to the periphery of the disks. In this disclosure, matching waveforms include complimentary waveforms, mirroring geometries that include cavities and other beneficial geometric features. FIGS. 8-10, 11B, 11C, 14, 15B-15D, and 20-23 illustrate a variety of examples of these waveforms.

In this disclosure, a bearing may take a variety of forms while minimizing the friction between components with examples of material for a bearing including, but are not limited to, ceramics, nylon, phenolics, bronze, and the like. Examples of bearings include, but are not limited to, bushings and ball bearings. In at least one alternative embodiment, the bearing function uses magnetic fields to center and align rotating components within the system instead of mechanical bearings.

In this disclosure, examples of non-conducting material for electrical isolation include, but are not limited to, non-conducting ceramics, plastics, Plexiglas, phenolics, nylon or similarly electrically inert material. In some embodiments, the non-conducting material is a coating over a component to provide electrical isolation.

In this disclosure, examples of non-magnetic (or very low magnetic) materials for use in housings, plates, disks, rotors, and frames include, but are not limited to, aluminum, aluminum alloys, brass, brass alloys, stainless steel such as austenitic grade stainless steel, copper, beryllium-copper alloys, bismuth, bismuth alloys, magnesium alloys, silver, silver alloys, and inert plastics. Although non-magnetic materials are used for rotating components, the rotating components have been found to be conductors in some embodiments. Examples of non-magnetic materials for use in bearings, spacers, and tubing include, but are not limited to, inert plastics, non-conductive ceramics, nylon, and phenolics.

In this disclosure, examples of diamagnetic materials include, but are not limited to, aluminum, brass, stainless steel, carbon fibers, copper, magnesium, bismuth, and other non-ferrous material alloys some of which containing high amounts of bismuth relative to other metals.

B. Overview

The present invention in at least one embodiment provides a system and method for providing levitation and/or lateral positioning for a vehicle such as a train over a track and/or rail bed by using a flux field generator that provides, in at least one embodiment, diamagnetic fields along the axis of rotation and/or perpendicular to that axis. In the embodiment illustrated in FIG. 1, the flux field generator 85 would have a vertical orientation such that the axis of rotation would be substantially vertical to the rail bed 80. Further in this embodiment, the rails 81 would include a third (or center) rail 82, which would provide levitation to the vehicle 90, running substantially between and parallel to the other two rails (or positioning rails) 81, which would provide alignment and centering of the vehicle 90. In at least one embodiment, the third rail 82 would be layered and/or coated with a rare earth magnetic material and/or a series of magnets including electromagnets. In at least one further embodiment to the above embodiments, the other two rails 81 are layered and/or coated with a rare earth magnetic material and/or a series of magnets including electromagnets. In at least one embodiment, the positioning rails 81 are omitted. In a further embodiment, the rails 81, 82 are replaced by a cross-section substantially U-shaped rail.

Figure 2:
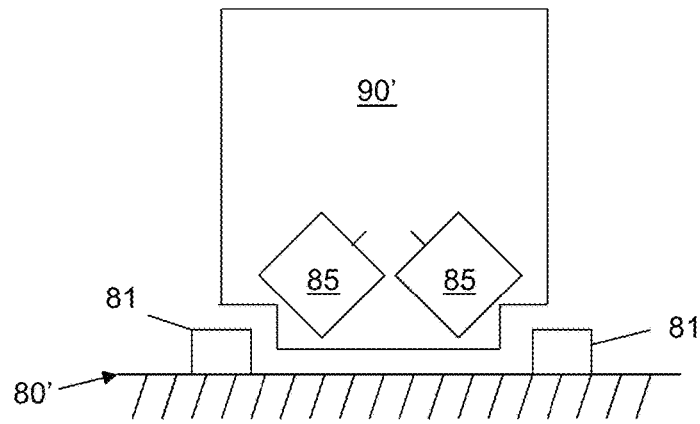
FIG. 2 illustrates a block diagram according to the invention.

In another embodiment illustrated in FIG. 2, the axis of rotation of the flux field generator 85 are positioned in the vehicle 90' to be approximately 45 degrees from the rail bed 80', pointing towards a respective rail 81, and approximately perpendicular to the rails 81 when viewed from the side or top of the rails. In this embodiment, the rails 81 would be layered and/or coated with a rare earth magnetic material and/or a series of magnets including electromagnets. The flux field generators 85 would provide levitation and positioning between the rails 81. In at least one further embodiment, the third rail is included to provide additional material for the flux field generators to act against with the peripheral fields.

Figure 3:
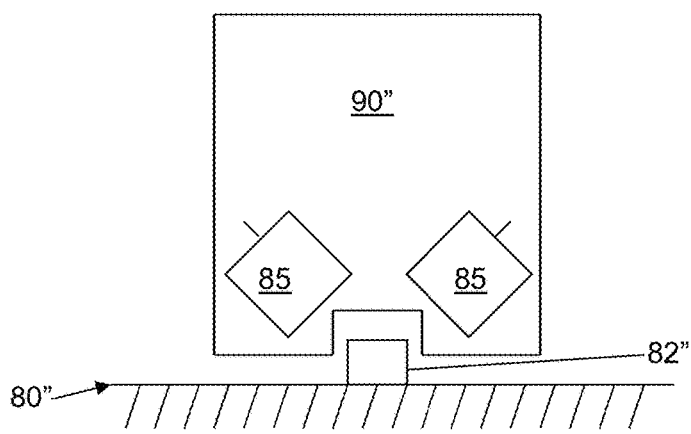
FIG. 3 illustrates a block diagram according to the invention.

In another embodiment illustrated in FIG. 3, the axis of rotation of the flux field generator 85 are positioned in the vehicle 90" to be approximately 45 degrees from the rail bed 80" with one rail 82 and approximately perpendicular to the rail 82". The flux field generators 85 would be paired such that there is one on each side of the rail 82" pointing down towards the rail 82". In this embodiment, the rail 82" is layered and/or coated with a rare earth magnetic material and/or a series of magnets including electromagnets. The flux field generators 85 would provide levitation and positioning along the rail 82".

In at least one further embodiment to any of the prior embodiments, propulsion along the tracks is obtained by using, for example, cycling electromagnets along the path to be followed to attract, neutral, and then repulse as the vehicle 90 relative to the rails 81/82, which in an alternative embodiment would include a series of electromagnetic sections. In at least one embodiment, the distribution system includes at least one rail connector to establish a connection between the flux field generator 85 and the rail. In at least one embodiment, the rail connector includes a bushing(s), a brush(es), an inductive coupling(s), or a diamagnetic repulsor(s) that contacts the rail(s) and/or induces field energies to transfer at least electrical power to the rail(s) to power a segment of electromagnets below (or to the side of) the vehicle being levitated. In an alternative embodiment, strong, repulsive diamagnetic fields are transmitted through large non-magnetic conductors to rails made from non-magnetic conductive materials, which in at least one embodiment mounts the magnets (or electromagnets) on the vehicle.

Figure 4A:
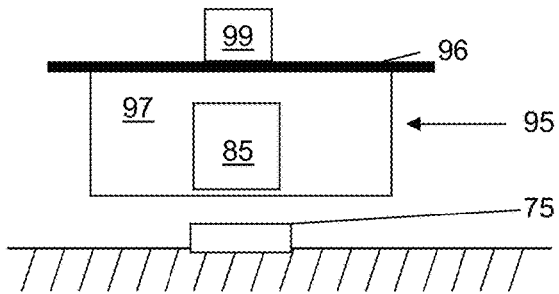
FIGS. 4A and 4B illustrate a block diagram and an illustration according to the invention.
Figure 4B:
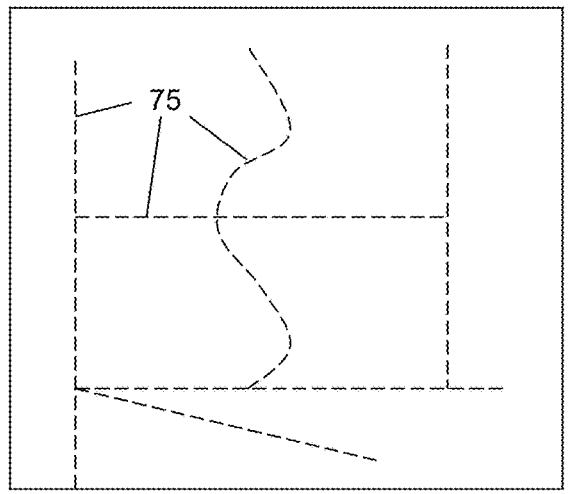

In at least one embodiment illustrated in FIG. 4A, the vehicle is a platform 95 for use with a floor (or ground) based grid and/or track system 75 for the platform 95 to follow. The platform 95 in at least one embodiment includes a support surface 96 for holding objects 99 on a housing 97 in which the at least one flux field generator 85 is located. The flux field generator 85 creates a magnetic field that provides levitation from its interaction with the track system 75. In at least one embodiment, the track system 75 includes magnetic material and/or electromagnets placed along, above, in or some combination of these in connection with the floor. This embodiment will allow the platform 95 to be moved about the track system 75 with manual force applied by a worker and/or propulsion such as cycling electromagnets along the path to be followed to attract, neutral, and then repulse as the platform 95 progresses along the track 75. The track 75 may take a variety of forms to fit within a particular workspace/environment. FIG. 4B illustrates an example of a floor with the track system 75 (pathway examples are shown in dotted lines) installed. Based on this disclosure it should be understood that the pathway examples can be used in a variety of combinations of those illustrated in FIG. 4B or selected from a group including but not limited to straight lines, a grid, paths between existing shelf or storage units, paths around obstacles, etc. In at least one embodiment, the track system 75 is relocatable and/or movable to rearrange the layout or to relocate the track to another location. In an alternative embodiment, the flux field generator(s) can be connected to a non-magnetic, conducting track system and the magnets (or electromagnets) are located on the movable platform/vehicle. In a further embodiment, electricity is provided to the platform/vehicle through inductance or through, for example, a bushing or a brush.

In at least one further embodiment to the above-described embodiments, the vehicle would have one or more flux field generators proximate to the ends of the vehicle. In further embodiments, the flux field generators are spaced along the length of the vehicle. In the case of a train for purposes of these two embodiments, each car of the train would be considered to be a vehicle in at least one embodiment.

Figure 5A:
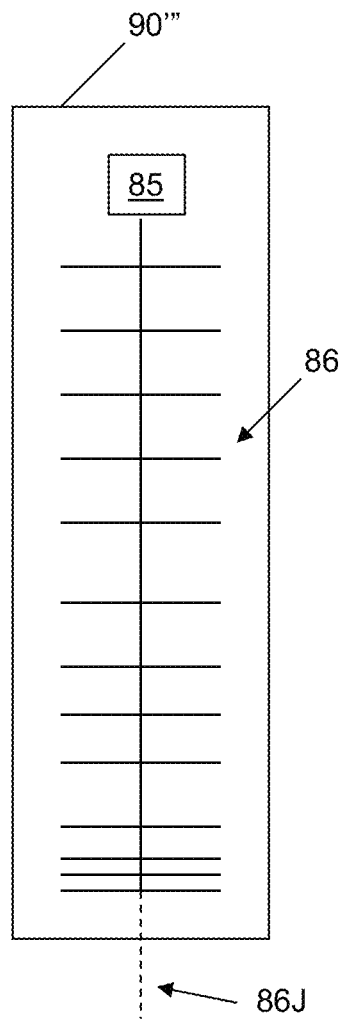
FIGS. 5A and 5B illustrate a representative schematic according to the invention.
Figure 5B:
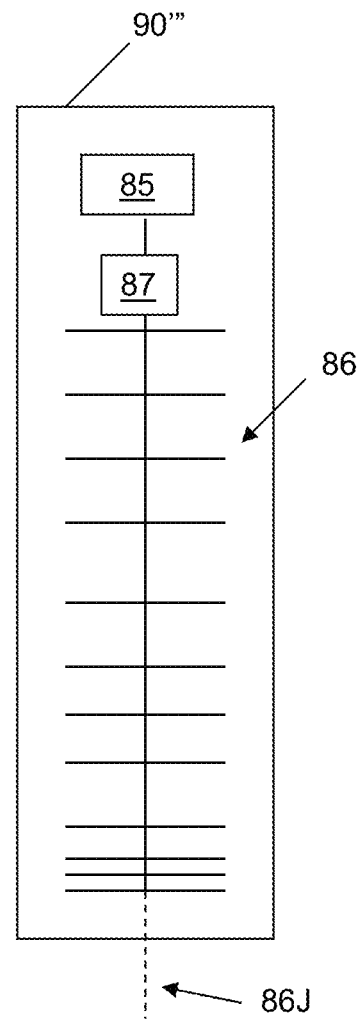

FIGS. 5A and 5B illustrate two examples of a distribution system embodiment according to the invention. The figures illustrate the distribution systems 86/87 from a top view looking down into the vehicle. Both systems include a flux field generator 85 that is coupled to a distribution system 86 that moves the generated diamagnetic field from the flux field generator 85 to other points within the vehicle 90''', 90''''. In at least one embodiment where there are multiple vehicles connected together, the distribution system 86 includes a connection across the junction 86J (the dotted line representing this as an option) of two vehicles to further distribute the generated diamagnetic field. The distribution system 86 in at least one embodiment includes a matrix of structural elements (including solid members and/or conduits) and/or cable that extends out from the flux field generator 85 such that there are a plurality of free ends located proximate to the points where the diamagnetic field is desired for delivery, for example, the location of the flux field generators in the previous embodiments. In experimentation with a flux field generator prototype it has been found to be possible to transfer the diamagnetic fields that are generated down a copper cable and be able to move a magnetic ball along a surface both pushing and pulling. In at least one embodiment, the delivery free ends include a field delivery shield that directs the diamagnetic field towards the target to be repulsed. In at least one embodiment, the field delivery shield includes at least one of the following materials in combination as an alloy or in layers: copper, bismuth, steel, sheet steel, silver, nickel, gold, platinum, carbon-fiber structures, and mercury (in a static vessel or in motion). In testing with a steel plate covering a rotor surface opposite the waveform members and leaving only a small pie shaped or rectangular opening, the diamagnetic field energy has been found to be focused and concentrated with the repulsive diamagnetic beam being sufficient to repel magnets beyond significant magnetic attraction, which declines at the square of the distance.

In at least one embodiment, the inductance connector to the distribution system 86 is placed into the field generated by the flux field generator 85 to transmit the created field throughout the connected distribution system 86. Examples of the inductance connector include the cable end and a structural member end such as a cantilever arm that are held in place by a framework that in at least one embodiment holds multiple free ends the distribution system 86 within the field.

In a further embodiment, the inductance connector includes a connector plate below or above a magnet plate containing a plurality of magnetic areas and/or magnets spaced from each other. The connector plate in at least one embodiment includes at least one of the following materials individually or in combination as alloys or multiple layers: copper, bismuth, steel, silver, nickel, gold, platinum, carbon-fiber structures, and mercury (in a static vessel or in motion). The free end of the distribution system members abut and/or are connected to the connector plate, which serves in at least one embodiment as a field focuser and/or concentrator that transfers the field to the distribution system 86. The connection between the free end of the distribution system member and the connector plate can, for example, be above, below and/or on the side (perpendicularly, tangentially or otherwise angled). In at least one embodiment, a flux return (discussed later) is present within the stack.

In at least one embodiment, the flux field generator 85 includes multiple levels of disk-pack turbines, magnet plates, connector plates, etc. that are stacked. The distribution system 86 transmits at least a portion of the generated field along/around its matrix to release locations/points where the matrix includes termination points at particular locations, for example, along the center of the vehicle pointing down to provide a repulsive force against the outer rails and/or the third middle rail for levitation and/or positioning of the vehicle. The distribution system 86 in at least one embodiment includes material similar to that used for the connector plate.

In at least one embodiment, the flux field generator 85 is placed in a location of the vehicle to provide levitation and/or positioning repulsive and/or attractive forces in addition to the distribution system 86, while in other embodiments the flux field generator 85 is located in a convenient location for maintenance access and/or use of the vehicle. In other embodiments, there is a plurality of flux field generators 85 transmitting diamagnetic fields along the distribution system 86.

Figure 23:
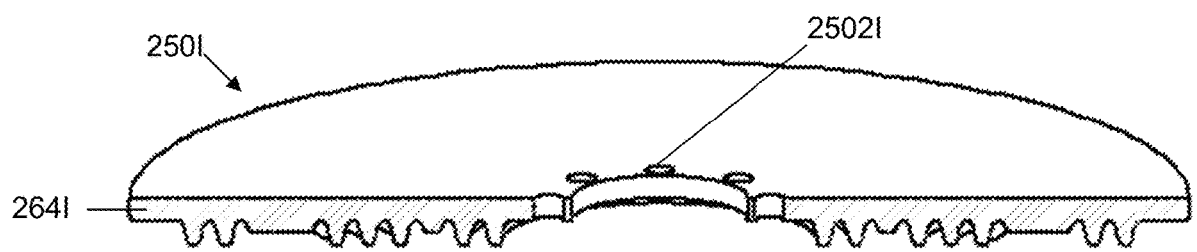
FIG. 23 illustrates another example disk-pack turbine according to the invention.
Figure 23:
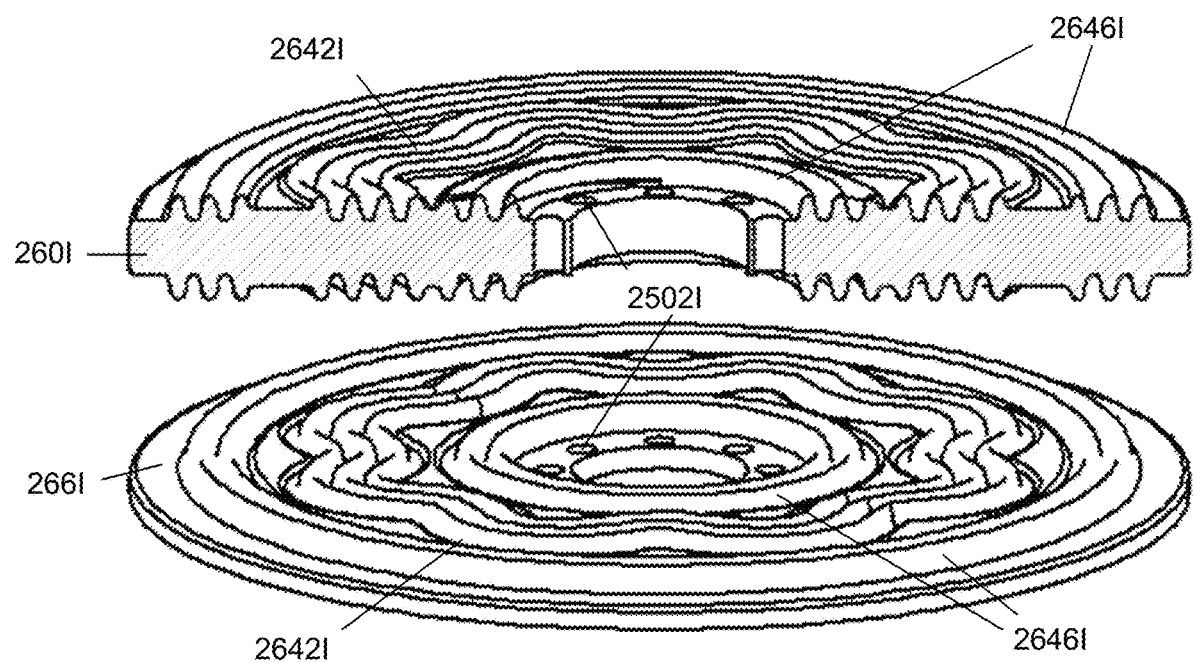

FIG. 5B illustrates a modified embodiment where the magnetic field is collected by the distribution system 86 and transferred into and/or through a battery and/or capacitor bank 87 for at least one of storage and/or buffering of the magnetic field in the distribution system. In an alternative embodiment, the battery and/or capacitor bank 87 receives electricity generated by the flux field generator 85. Initial testing indicates that electricity produced by at least some test flux field generators reduces the resistance present in material at least for a period of time. FIG. 23 illustrates a schematic of one approach for connecting a battery (or capacitor) bank 87 to a flux field generator used to produce electricity.

In at least one further embodiment to the above distribution system embodiments, the repulsive forces transmitted through the distribution system are used for other purposes than levitation and to that end the system is not dependent on being present on a vehicle. In at least one further embodiment, the platform 95 illustrated in FIG. 4A includes a rotating magnet platter while the track 75 is a distribution system 86 powered by a flux field generator 85 that is not present on the platform 95, but instead could be, for example, in a corner of a building. In a further embodiment, the track includes a plurality of delivery free ends that in at least one embodiment are provided selectively with diamagnetic fields based on the location of platforms 95 (or other equipment using the technology for levitation) that require levitation.

In at least one further embodiment to the above-described embodiments, the vehicle includes wheels, supports, and/or other cushion device/system for when the levitation function is not in use on the vehicle.

Examples of the structure and components of a flux field generator are provided in the following examples. In the embodiments that are described as including power generation, the generated power in at least some embodiments is fed back into the system to maintain operation of the system and in further embodiments could be utilized for other functions on board the vehicle including operation of electrical devices, electromagnetic magnets, and recharging batteries. The use of risers in the various flux field generator examples provide an example of the structure around the different example flux field generators that could be modified and adapted for housing and/or vehicle structure to secure and/or position the flux field generator(s) in the vehicle.

Figure 6:
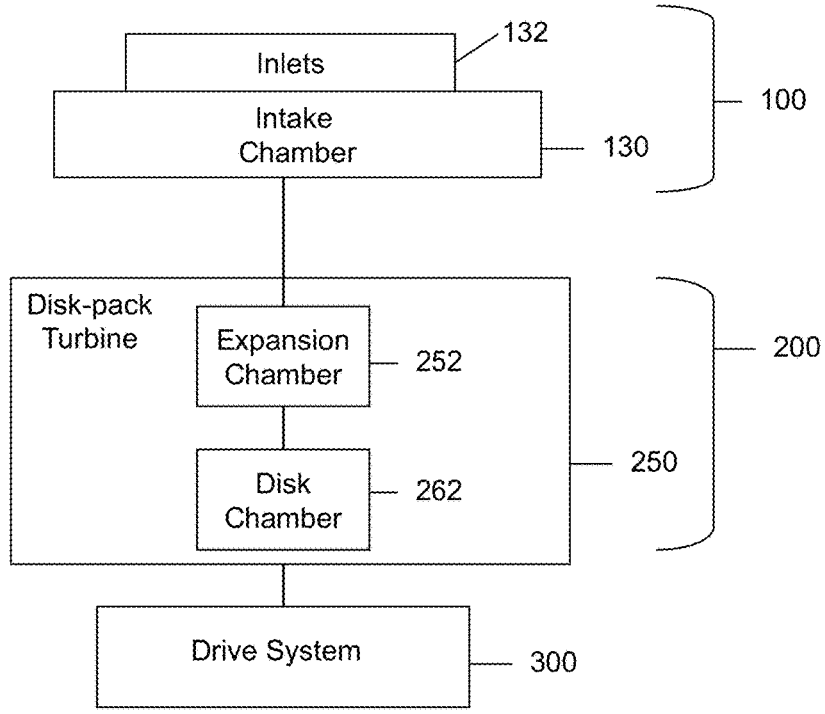
FIG. 6 illustrates a block diagram according to the invention.

The systems and methods of the flux field generator in at least one embodiment include an intake chamber and a disk-pack turbine having an expansion and distribution chamber (or expansion chamber) in fluid communication with the intake chamber, and disk chambers formed between the rotors and/or disks that form the expansion chamber as illustrated, for example, in FIG. 6. In at least one embodiment, the intake chamber serves to draw charging media, i.e., liquids and/or gases (hereinafter collectively referred to as "fluid" or "media" or "material") into the system before passing the charging media into the expansion chamber. The expansion chamber is formed by two or more stacked rotatable rotors and/or disks having an opening in their center. The stacked rotatable waveform members (e.g., rotors and/or disk(s)) are centered axially such that one or more openings are aligned whereby the aligned openings form the expansion chamber. The expansion chamber may include a variety of shapes, ranging from a horizontal substantially cylindrical shape to varying degrees of converging and diverging structures. However, in at least one embodiment for the flux field generator, the expansion chamber includes both a convergent structure and a divergent structure designed to first compress, and then expand the media. In an alternative embodiment for the flux field generator, the system draws in fluid including environmental air and other gasses from the periphery in addition or in place of the intake chamber. In still other embodiments, the fluid intake is not required for operation of the system and as such those components can be omitted leaving a support structure, a drive system, and at least one disk-pack turbine.

In some embodiments for the flux field generator, the intake chamber may be formed as a vortex induction chamber that creates a vertical vortex in the charging media, which in most embodiments is a fluid including liquid and/or gas, in order to impart desired physical characteristics on the fluid. Examples of how the charging media is provided include ambient air, pressurized supply, and metered flow. The vertical vortex acts to shape, concentrate, and accelerate the charging media into a through-flowing vortex, thereby causing a decrease in temperature of the charging media and conversion of heat into kinetic energy. These effects are realized as the charging media is first compressed, then rapidly expanded as it is drawn into the expansion chamber by the centrifugal suction/vacuum created by the dynamic rotation and progressive geometry of the disks. The vortex also assists the fluid in progressing through the flux field generator, i.e., from the vortex induction chamber, into the expansion chamber, through the disk chambers formed by the patterns and channels created by the waveforms such as hyperbolic waveforms on the disks, and out of the system. In some embodiments for the flux field generator, there may also be a reverse flow of fluid within the system where fluid components that are dissociated flow from the disk chambers to the expansion chamber back up (i.e., flow simultaneously axially and peripherally) through the vortex chamber and, in some embodiments, out the fluid intakes. Media (or material) tends toward being divided relative to mass/specific gravity, with the lighter materials discharging up through the eye of the vortex while simultaneously discharging gases/fluids of greater mass at the periphery. While progressing through the waveform geometries, the charging media is exposed to a multiplicity of dynamic action and reactionary forces and influences such as alternating pressure zones and changing circular, vortex and multi-axial flows of fluid as the fluid progresses over the valleys and peaks and highly variable hyperbolic and/or non-hyperbolic geometries.

The number and arrangement of disks can vary depending upon the particular flux field generator. Examples of the various disk arrangements for the flux field generators include paired disks, multiple paired disks, stacked disks, pluralities of stacked disks, multi-staged disk arrays, and various combinations of these disk arrangements as illustrated, for example, in FIGS. 8, 11A-11C, 15D, 20E, and 23. Further examples add one or more rotors to the disks. A disk-pack turbine is a complete assembly with rotors and/or disks being elements within the disk-pack turbine. In at least one embodiment for the flux field generators, the bottom rotor (or disk) includes a parabolic/concave rigid feature that forms the bottom of the expansion chamber. In at least one alternative embodiment, the disk-pack turbine includes one rotor or disk with one surface having a plurality of waveforms.

As the highly energized charging media passes from the vortex induction chamber into the expansion chamber, the charging media is divided and drawn into channels (or disk chambers) created by the waveforms on the stacked disks. Once within the rotating waveform patterns, the media is subjected to numerous energetic influences, including sinusoidal, tortile, and reciprocating motions in conjunction with simultaneous centrifugal and centripetal dynamics. See, e.g., FIG. 10. These dynamics in at least one embodiment include a multiplicity of multi-axial high pressure centrifugal flow zones and low pressure centripetal flow zones, the majority of which are vortexual in nature.

C. First Example Flux Field Generator

FIG. 6 provides a broad overview of an example of a flux field generator for use in the present invention. This overview is intended to provide a basis for understanding the principles and components of the various embodiments for the flux field generators that can be used in the present invention that will be discussed in more detail below. The flux field generator as illustrated in FIG. 6 includes an optional intake module 100 with an intake chamber 130 and a disk-pack module 200 having an optional expansion chamber 252 and a disk-pack turbine 250. To simplify the discussion, the optional housing around the disk-pack turbine 250 is not included in FIG. 6. The intake chamber 130 is in fluid communication with the expansion chamber 252. In at least one embodiment, the intake module 100 is omitted with the expansion chamber 252 drawing air in as needed from the surrounding environment. The expansion chamber 252 is formed by openings and the recess present in the rotors and/or disk(s), which in at least one embodiment when a waveform is present on them will be an example of a waveform member, that form the disk-pack turbine 250. See, e.g., FIGS. 8 and 9. The rotatable rotors and/or disks are stacked or placed adjacent to each other such that a small space of separation remains between the adjacent waveform members to form disk chambers.

In a further embodiment for an embodiment using a pair of rotors in the disk-pack turbine, the rotors each have a waveform pattern on at least part of the surface opposite where the disk is attached to the rotor. In an embodiment where there are no rotors present, the outside disks in stack include a waveform pattern on at least part of their exposed surface. The waveform pattern in at least one embodiment is substantially an exact reverse representation (or mirror image) of the waveform pattern present on the face facing the neighboring disk. An example of a mirror image is that if there is a protrusion on the inner surface then there is a matching protrusion on the outer surface. The waveform pattern in at least one embodiment is substantially a negative image of the waveform pattern present on the face facing the neighboring disk. An example of a negative image is that if there is a protrusion on the inner surface then there is a substantially matching channel on the outer surface. Based on this disclosure, it should be appreciated that a combination of mirror and negative images may be present on one waveform surface.

The drive system 300 in at least one embodiment is connected to the disk-pack turbine 250 through a drive shaft 314 or other mechanical linkage 316 (see, e.g., FIG. 9) such as a belt, and in a further embodiment the drive system 300 is connected directly to the disk-pack turbine 250. In use, the drive system 300 rotates the plurality of rotors and/or disks in the disk-pack turbine 250. In at least one embodiment, the rotation of which creates a centrifugal suction or vacuum within the system that causes a charging media to be drawn into the intake chamber 130 via at least one inlet 132 and in further embodiments the fluid is drawn in from a periphery of the disk-pack turbine 250. In at least one example, the intake chamber 130 and the at least one inlet are together an inlet for the disk-pack turbine 250.

The intake chamber 130 when present concentrates (and/or compresses) and passes the charging media into the expansion chamber 252. The expansion chamber 252 causes the compressed charging media to quickly expand after entry into the expansion chamber 252 (in at least one embodiment the charging media enters in a vortex flow) and distribute through the disk chambers 262 and over the surfaces of the disk-pack turbine members towards a periphery via the disk chambers 262 and in some embodiments back towards the expansion chamber 252. In at least one embodiment, components of the fluid reverse course through the system, for example, lighter elements present in the fluid that are dissociated from heavier elements present in the fluid. In at least one embodiment, the system includes a capture system for one or more of the dissociated fluid elements. The media is conditioned as it passes between the rotating disks from the center towards the periphery of the disks. In at least one embodiment, the intake chamber 130 is omitted.

D. Second Example Flux Field Generator

Figure 7:
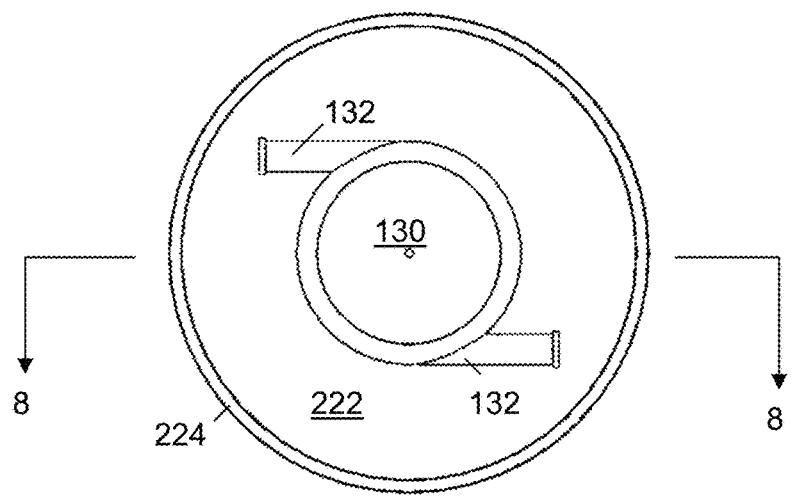
FIG. 7 illustrates a top view of an embodiment according to the invention.
Figure 8:
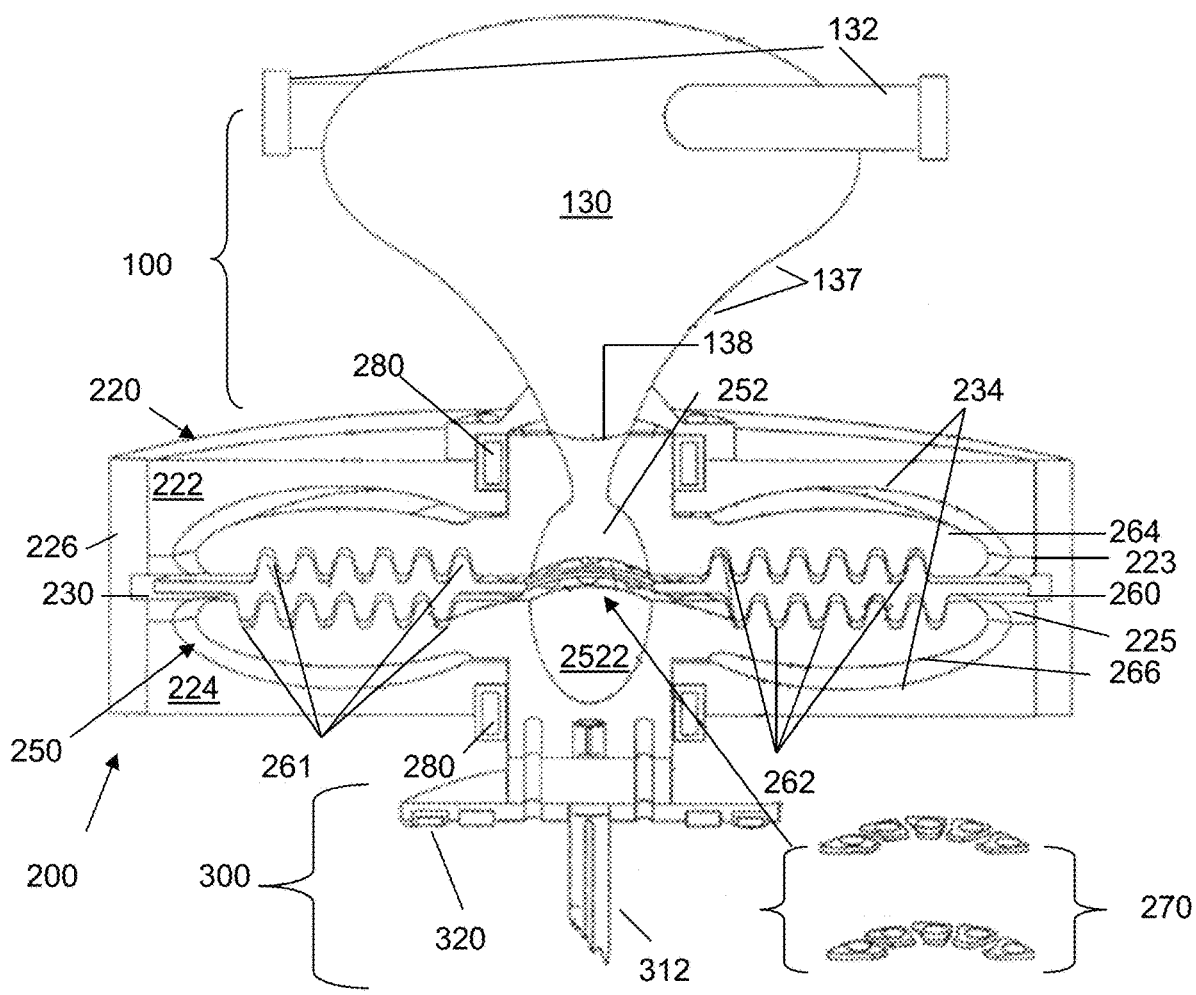
FIG. 8 illustrates a cross-sectional view of the system illustrated in FIG. 7 taken at 8-8.
Figure 9:
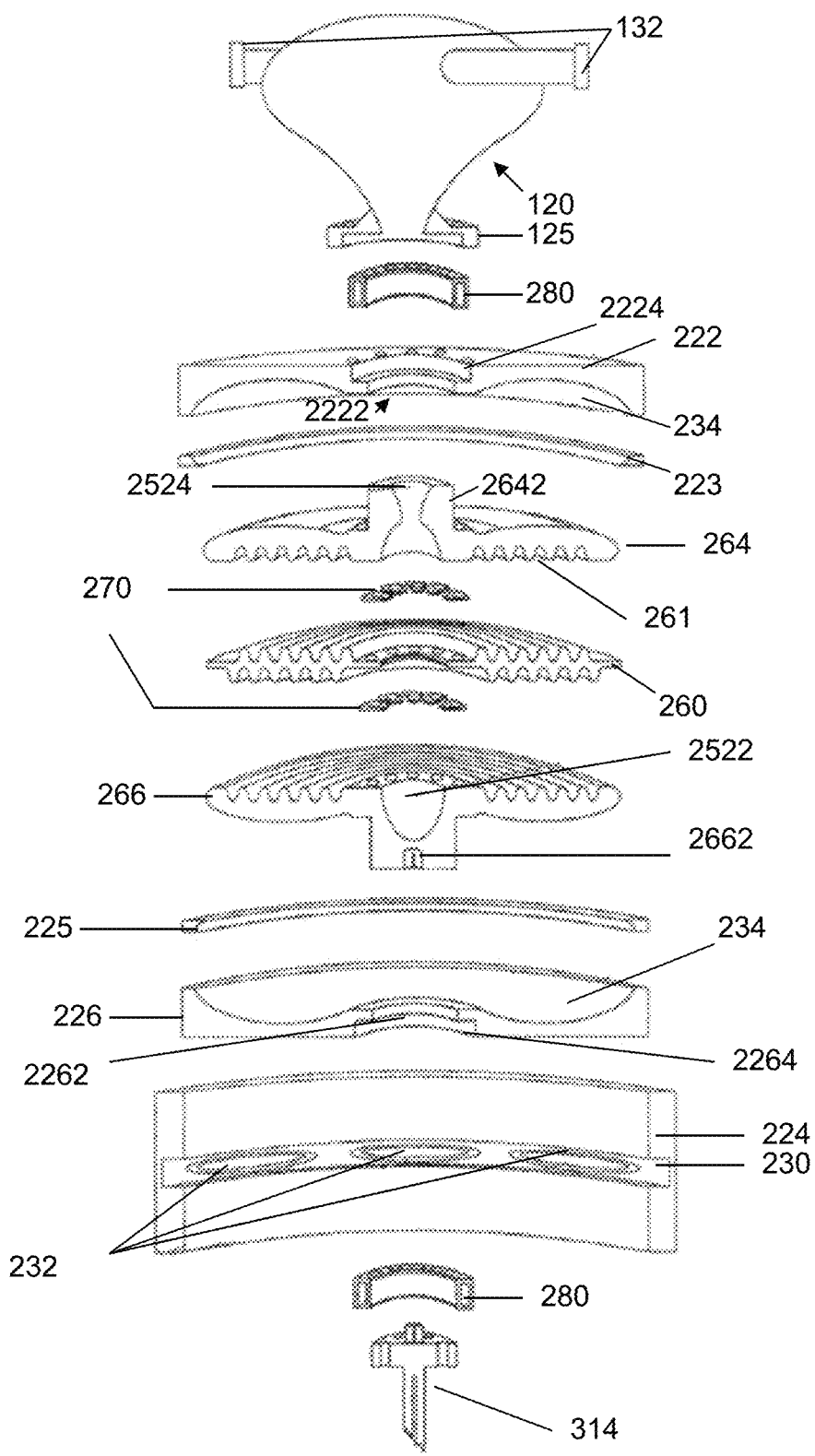
FIG. 9 illustrates an exploded and partial cross-sectional view of the system illustrated in FIG. 7.

FIGS. 7-9 provide various views of an example embodiment for the flux field generator. FIGS. 7 and 8 illustrate the flux field generator including an optional fluid intake module 100 with a vortex induction chamber (or vortex chamber) 130 and a disk-pack module 200 with a housing 220, and a disk-pack turbine 250 with an expansion chamber 252. The fluid intake module 100 acts as a source of the charging medium provided to the disk-pack module 200.

FIGS. 8 and 9 illustrate, respectively, a cross-section view and an exploded cross-section view of the flux field generator in accordance with the example illustrated in FIG. 7. The housing 220 around the disk-pack turbine 250 provides an enclosure in which the disk(s) 260 and rotors 264, 266 are able to rotate. The following disclosure provides an example of how these modules may be constructed and assembled. As such based on this disclosure, it should be appreciated that other assembly approaches may be used while still accomplishing the function of the system.

The fluid intake module 100 includes a vortex chamber (or intake chamber) 130 within a housing 120 having fluid inlets 132, which in at least one example are sized and angled to assist in creating a vortex in the charging medium within the vortex chamber 130. The vortex chamber 130 is illustrated as including an annular mounting collar 125 having an opening 138. The collar 125 allows the intake chamber 130 to be connected in fluid communication with the expansion chamber 252. The fluid intake module 100 sits above the disk-pack module 200 and provides the initial stage of fluid processing. In at least one embodiment, the vortex chamber 130 is stationary in the system with the flow of the charging media through it driven, at least in part, by rotation of the disk-pack turbine 250 present in the housing 220. In another embodiment, a vortex is not created in the charging media but, instead, the vortex chamber 130 acts as a conduit for moving the charging media from its source to the expansion chamber 252.

The disk-pack module 200 includes at least one disk-pack turbine 250 that defines at least one expansion chamber 252 in fluid communication with the vortex chamber 130. The fluid exits from the vortex chamber 130 into the expansion chamber 252. The expansion chamber 252 as illustrated is formed by a rigid feature 2522 incorporated into a lower rotor (or lower disk) 266 in the disk-pack turbine 250 with the volumetric area defined by the center holes in the stacked disks 260 and an upper rotor 264. In at least one embodiment, there are multiple expansion chambers within the disk-pack turbine each having a lower disk 266 with the rigid feature 2522. In at least one embodiment, the rigid feature 2522 is omitted.

As illustrated, the disk-pack turbine 250 includes an upper rotor 264, a middle disk 260, and a lower rotor 266 with each member having at least one surface having a waveform pattern 261 present on it. The illustrated at least one rotatable disk(s) 260 and rotors 264, 266 are stacked or placed adjacent to each other such that a small space of separation remains between the adjacent disk/rotor to form disk chambers 262 through which the charging media will enter from the expansion chamber 252. The disk chambers 262 are lined with waveforms 261 that are complementary between adjacent rotor/disk(s) as illustrated, for example, in FIGS. 11A-11C, 15A, and 15B. In at least one embodiment, the waveforms include no angles along any radius extending from a start of the waveform pattern to the end of the waveform pattern. In FIG. 9, the illustrated waveform patterns 261 are a series of concentric circles, but based on this disclosure it should be understood that the concentric circles can be replaced by other patterns discussed in this disclosure and illustrated in the figures. The illustrated rotors 264, 266 and disk(s) 260 are spaced from each other to form disk chambers 262 between them that are in fluid communication with the expansion chamber 252. One way to space them apart is illustrated in FIGS. 8 and 9, where impellers (or wing shims) 270 such as ceramic spacers are used to separate them and also to interconnect them together so that they rotate together. Alternative materials besides ceramics that would work include materials that do not conduct electrical current to electrically isolate the illustrated rotors and disk from each other and the system. In further embodiments one or more of the upper rotor 264, the middle disk 264, and the lower rotor 266 are electrically connected. Another way they may be separated is using support pieces fixedly attached to support bolts running between the top and lower rotors 264, 266. In an alternative embodiment, the rotors 264, 266 and the disk(s) 260 are attached on their peripheries.

The upper rotor 264 and the lower rotor 266 include shoulders 2642, 2662 extending from their respective non-waveform surface. The upper rotor 264 includes a raised shoulder 2642 that passes through an opening 2222 in the upper case 222 of the disk-pack module 200 to establish a fluid pathway connection with the intake chamber 130. In the illustrated embodiment, the upper rotor shoulder 2642 is ringed by a bearing 280 around it that rests on a flange 2224 of the upper case 222 and against the inside of the collar 125 of the intake chamber housing 120. The lower rotor shoulder 2662 passes through an opening 2262 in a lower case 226 to engage the drive shaft 314. The lower rotor shoulder 2662 is surrounded by a bearing 280 that rests against the flange 2264 of the lower case 226. In an alternative embodiment, the upper rotor 264 and the lower rotor 266 include a nesting hole for receiving a waveform disk where the nesting hole is defined by a periphery wall with gaps for receiving a connection member of the waveform disk. See, e.g., FIG. 15D.

In at least one example, the center disk 260 will begin to resonate during use as it spins around the central vertical axis of the system and fluid is passing over its surface. As the center disk 260 resonates between the upper and lower rotors 264, 266, the disk chambers 262 will be in constant flux, creating additional and variable zones of expansion and compression in the disk chambers 262 as the middle disk resonates between the upper and lower rotors 264, 266, which in at least one embodiment results in varied exotic motion. The resulting motion in at least one embodiment is a predetermined resonance, sympathy, and/or dissonance at varying stages of progression with the frequency targeted to the frequency of the molecules/atoms of the material being processed to manipulate through harmonics/dissonance of the material.

The housing 220 includes a chamber 230 in which the disk-pack turbine 250 rotates. As illustrated in FIGS. 8 and 9, the housing chamber 230 and the outside surface of the disk-pack turbine 250 in at least one embodiment have complementary surfaces. The illustrated housing 220 includes the upper case 222, the bottom case 226, and a peripheral case 224. The illustrated housing 222 also includes a pair of flow inhibitors 223, 225 attached respectively to the upper case 222 and the bottom case 226. Based on this disclosure, it should be appreciated that some components of the housing 220 may be integrally formed together as one piece. FIG. 8 also illustrates how the housing 220 may include a paraboloid feature 234 for the chamber 230 in which the disk-pack turbine 250 rotates. The paraboloid shape of the outside surface of the disk-pack turbine 250, in at least one embodiment, assists with obtaining the harmonic frequency of the rotors 264, 266 and disk(s) 260 themselves as they spin in the chamber 230, thus increasing the dissociation process for the fluid passing through the system. In at least one embodiment, the rotors 264, 266 have complementary outer faces to the shape of the chamber 230.

The upper case 222 includes an opening 2222 passing through its top that is aligned with the opening in the bearing 280. As illustrated in FIGS. 8 and 9, a bearing 280 is present to minimize any friction that might exist between the shoulder 2642 of the top rotor 264 and the housing collar 125 and the upper case 222. The bearing 280, in at least one embodiment, also helps to align the top 2524 of the expansion chamber 252 with the outlet 138 of the vortex chamber 130. Likewise, the lower case 226 includes an opening 2262 passing through its bottom that is lined with a bearing 280 that surrounds the shoulder (or motor hub) 2662 of the lower disk 266.

The peripheral case 224 includes a plurality of discharge ports 232 spaced about its perimeter. The discharge ports 232 are in fluid communication with the disk chambers 262. The flow inhibitors 223, 225 in the illustrated system, in at least one embodiment, assist with routing the flow of fluid exiting from the periphery of the disk-pack turbine 250 towards the discharge ports (or collection points) 232 in the housing 220.

Additional examples of electrical isolation components include the following approaches. The drive system/spindle/shaft is electrically isolated via the use of a large isolation ring made of non-conductive material, which creates discontinuity between the drive shaft and ground. In at least one embodiment, all disk-pack turbine components are electrically isolated from one another utilizing, for example, non-conducting tubes, shims, bushings, isolation rings, and washers. The main feed tube (or intake chamber) is also electrically isolated from the top rotor via the use of an additional isolation ring. The feed tube and support structure around the system are electrically isolated via the use of additional isolation elements such as nylon bolts. In most cases, there is no electrical continuity between any components, from drive shaft progressing upward through all rotating components to the top of the vortex chamber and support structures. There are, however, occasions when electrical continuity is desirable as described previously.

Figure 10:
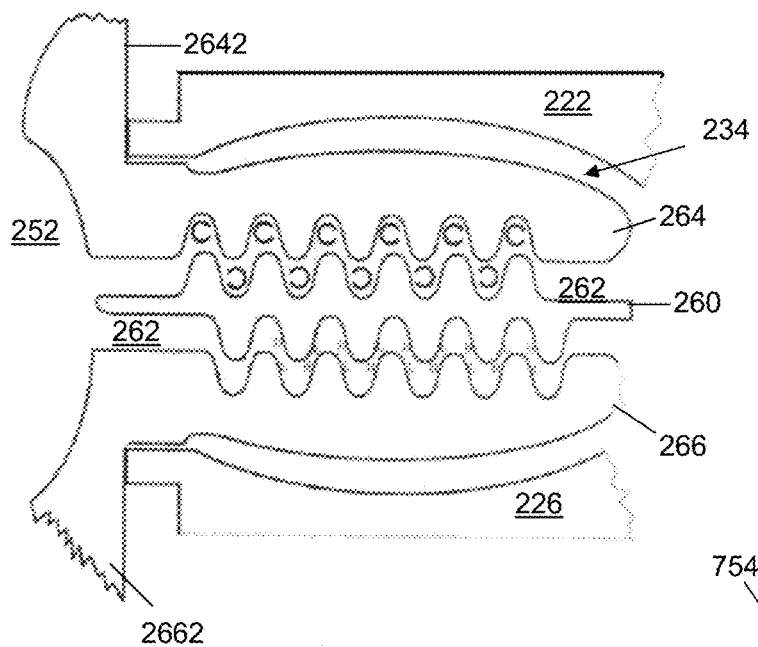
FIG. 10 illustrates a partial cross-sectional view of the system illustrated in FIG. 7.

FIG. 10 illustrates a partial cutaway view of the embodiment illustrated in FIGS. 7-9. FIG. 10 provides an example of the fluid flow dynamics within the disks in accordance with the present invention. Waveforms channels are formed in the disk chambers 262 by the geometric patterns 261 on the rotors 264, 266 and disk(s) 260. FIG. 10 illustrates how stepped waveform harmonics cause high and low pressure zones to form in the channels with the circulation of the flow illustrated from the top to the bottom of the zones by the C's (clockwise) and backward C's (counterclockwise) that reflect the circulation. These pressure zones and tortile reciprocating motion allow the charging media and material to flow within the channels and to break the bonds between atoms in at least one embodiment. As the disk-pack turbine 250 rotates the charging media within the expansion chamber 252, the charging media flows from the center of the disk-pack turbine 250 through the disk chambers 262 towards the periphery of the disk-pack turbine 250. As the charging media passes through the disk chambers 262 the media is conditioned, separated, dissociated, and/or transformed based on controllable variables such as construction materials, waveform geometry, tolerances, numbers of progressions, waveform diameters, disk stack densities, internal and external influences and charging media composition.

E. Flux Field Generator Examples with Power Generation

In at least one example the flux field generator produces and harnesses energy from ambient sources at rates that are over unity relative to the measurable electrical power input (i.e., invested energy input) by harnessing, utilizing and/or transmutating the ambient fields of energy, i.e., the electrical energy produced is higher than the electrical energy consumed (or electrical energy out is greater than electrical energy in). The flux field generator in at least one example utilizes rotating waveforms (e.g., FIGS. 11A-11C) to manipulate, condition, and transform mass and matter into highly energetic fields, e.g., polar flux, electrical, and electro-magnetic fields. In a further embodiment, the waveforms are hyperbolic waveforms that in at least one further embodiment are substantially, continuously curved to create relationships with applied magnetic and electromagnetic fields as well as multiple ambient energy fields and wavelengths, which is accentuated by motion, results in the harnessing and production of useful, compounding electrical, electromagnetic and magnetic field phenomena. In at least one embodiment, the flux field generator is capable of generating diamagnetic fields as strong forces at ambient operational temperatures. It should be appreciated that the power generation components may be omitted from these examples while still providing the flux field generator. In at least one further embodiment to each of the following embodiments, the power generation components of the coils and magnet plates are omitted.

Figure 12:
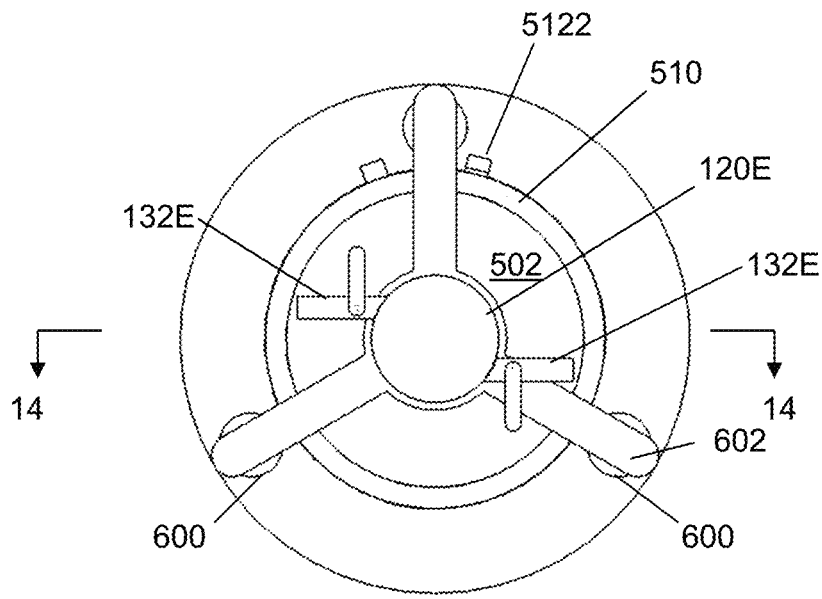
FIG. 12 illustrates a top view of another embodiment according to the invention.
Figure 13:
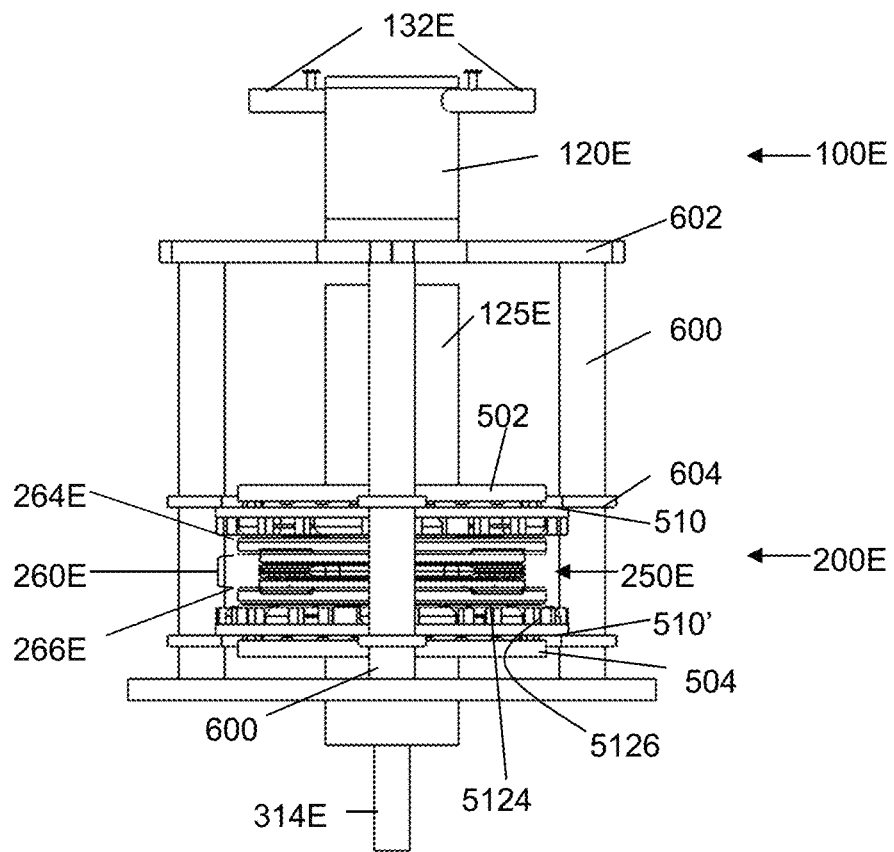
FIG. 13 illustrates a side view of the system illustrated in FIG. 12.
Figure 14:
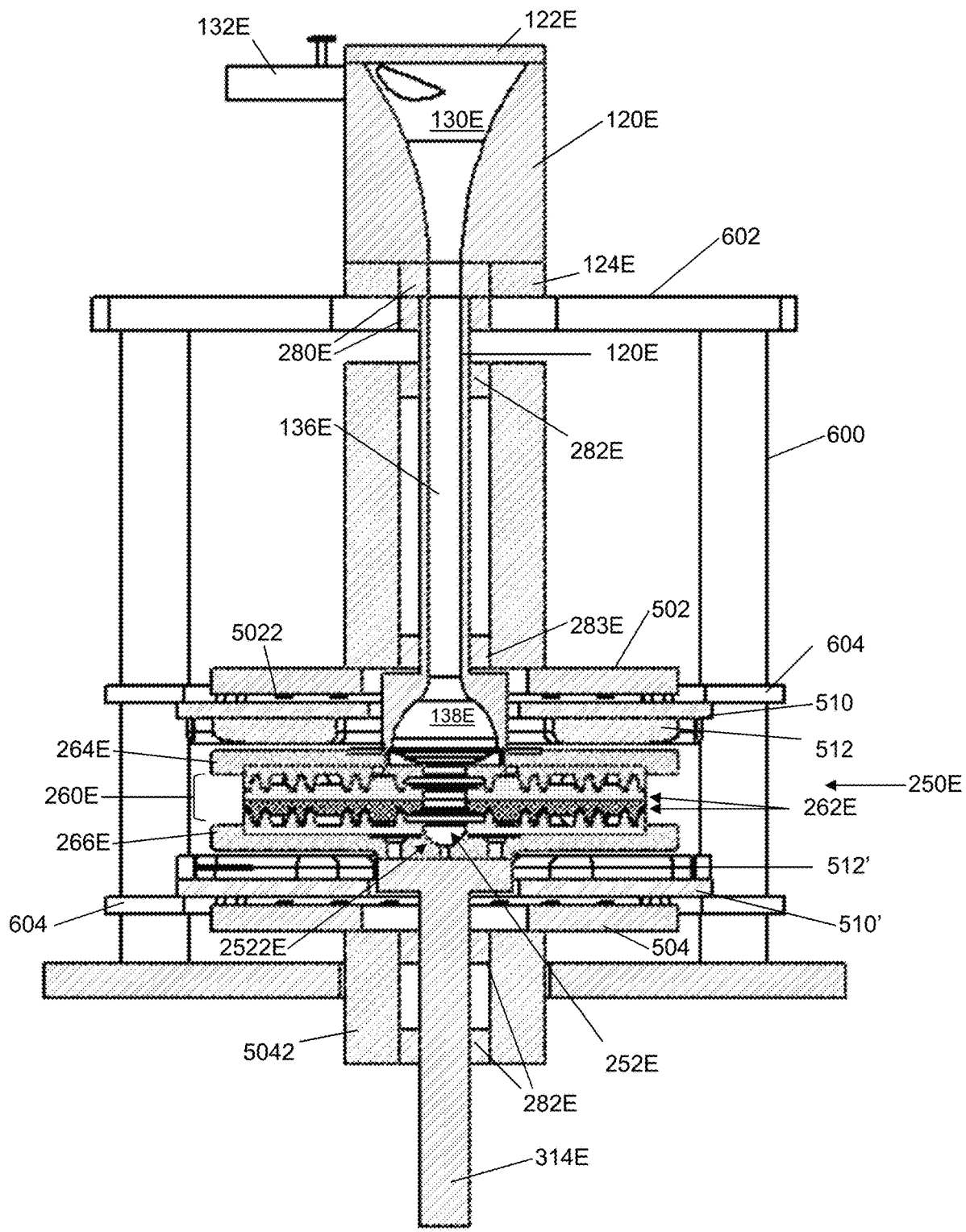
FIG. 14 illustrates a cross-sectional view of the system illustrated in FIG. 12 taken at 14-14 in FIG. 12.
Figure 15A:
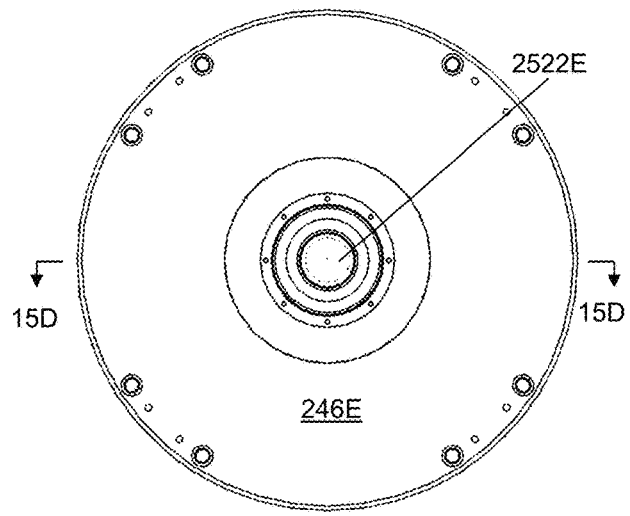
FIGS. 15A-15D illustrate another example disk-pack turbine according to the invention.
Figure 15B:
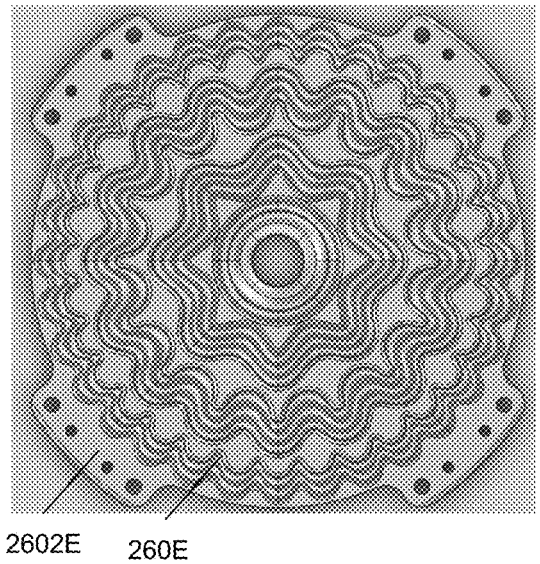
Figure 15C:
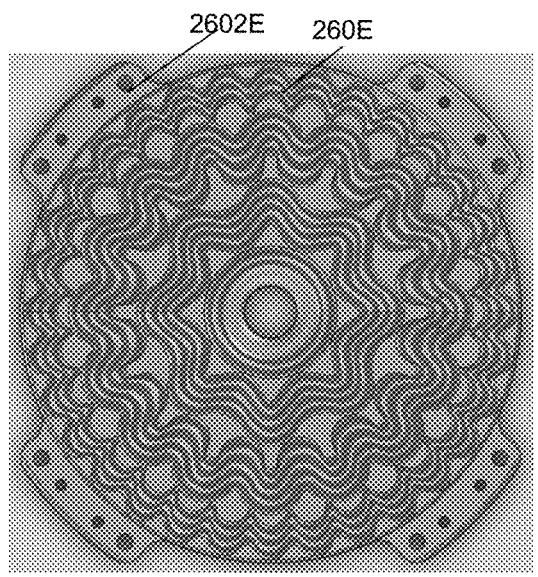
Figure 15D:
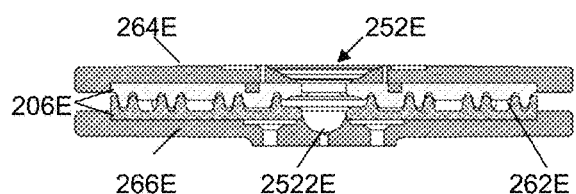

FIGS. 12-15D illustrate an example of the flux field generator useful in generating electrical energy. FIGS. 15A-15D illustrate a pair of waveform disks that can be mated together with a pair of rotors. The illustrated waveform disks are depicted in FIG. 14. FIG. 15A illustrates the top of a disk-pack turbine 250E with a top rotor 264E with an opening into the expansion chamber 2522E. FIGS. 15B and 15C illustrate a pair of mated disks for use in power generation according to the invention. The disks are considered to be mated because they fit together as depicted in FIG. 15D, because a disk channel (or chamber) 262E is formed between them while allowing fluid to pass between the disks 260E. FIG. 15D illustrates an example of the mated disks 260E placed between a top rotor 264E and a bottom rotor 266E with bolts attaching the components together around the periphery such as through ears 2602E. The bolts in at least one embodiment pass through a nylon (or similar material) tube and the spacers are nylon rings. Based on this disclosure, it should be understood that at least one rotor could be integrally manufactured with at least one waveform disk.

Figure 16:
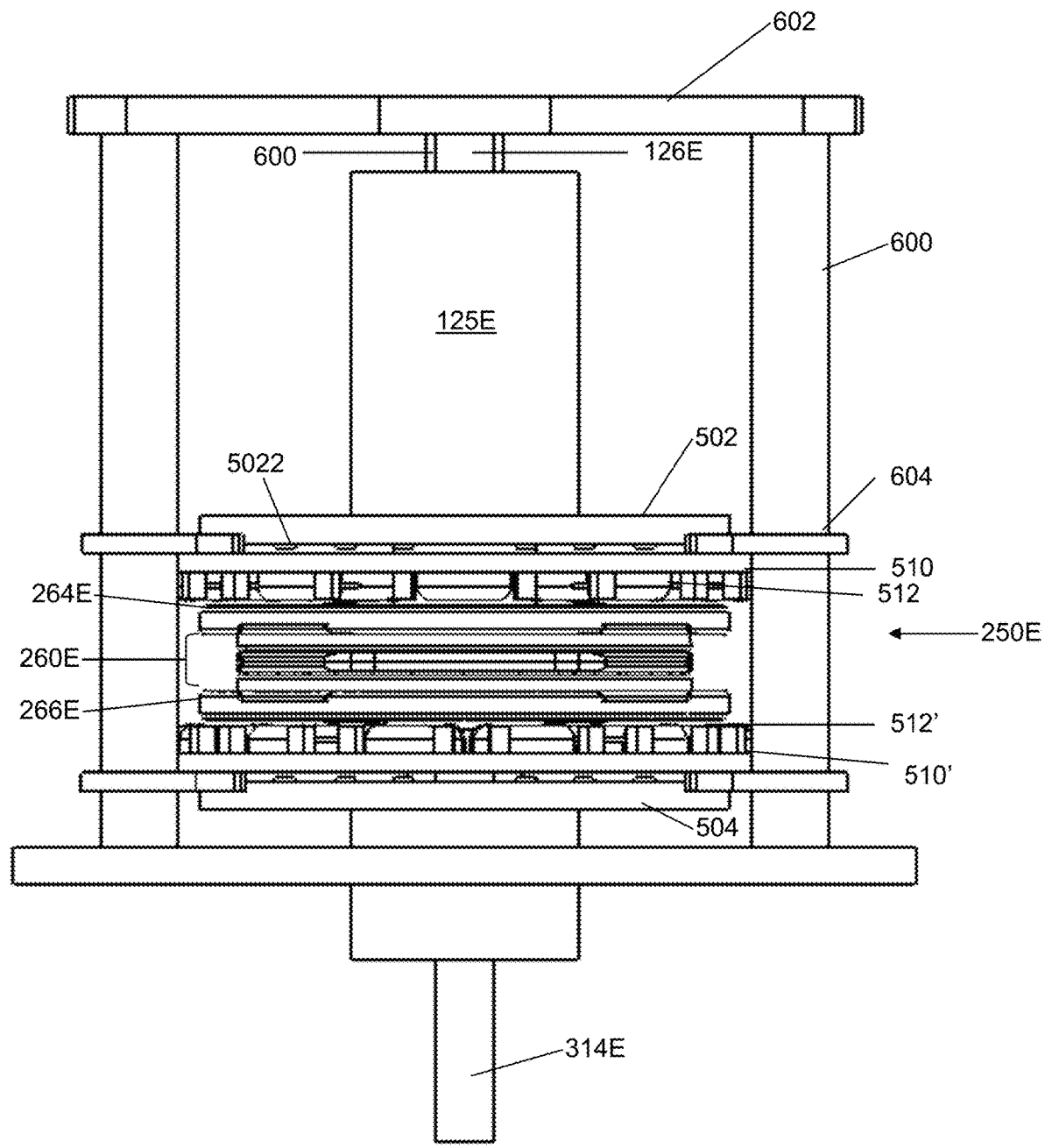
FIG. 16 illustrates a side view of another embodiment according to the invention.
Figure 17:
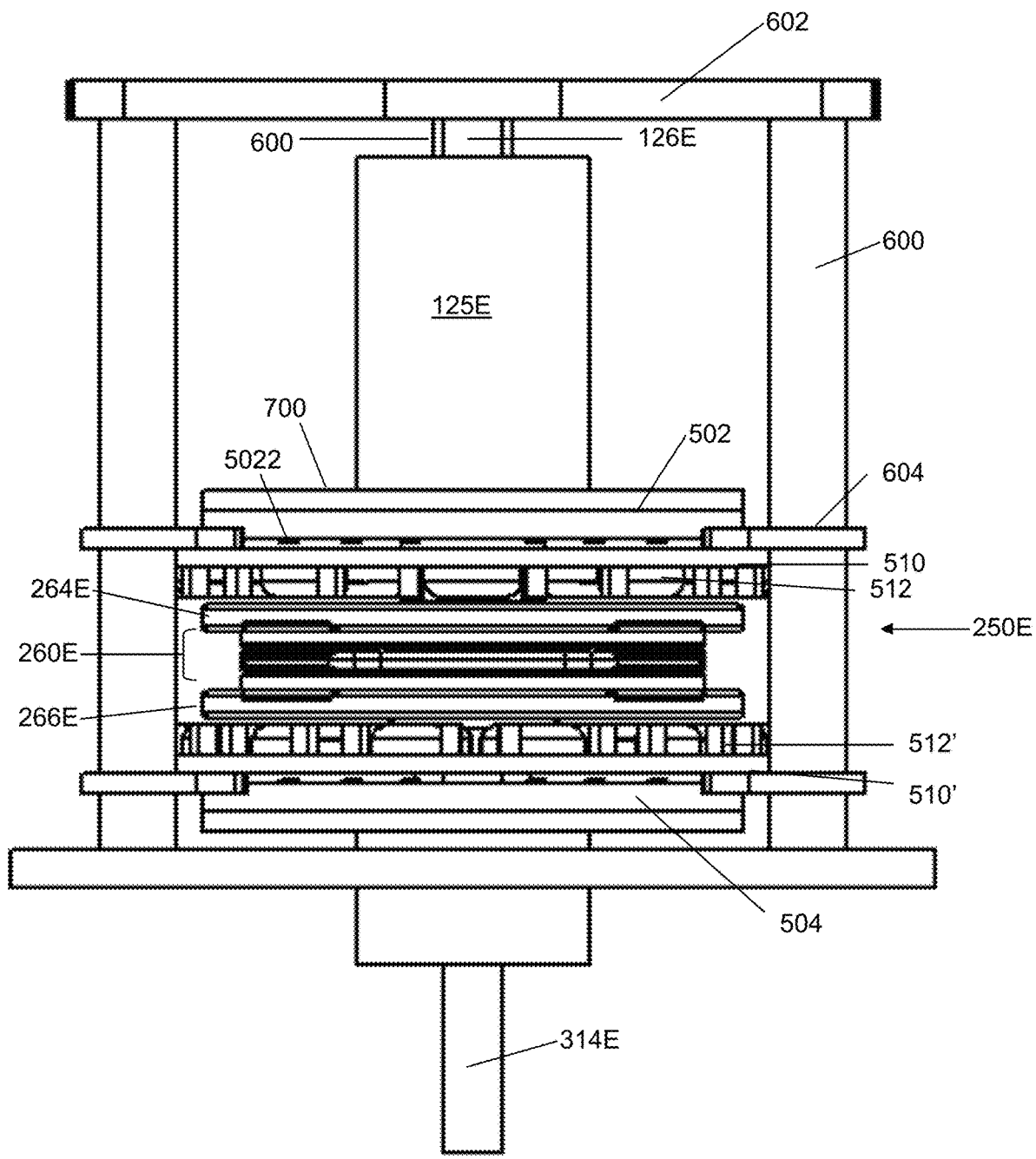
FIG. 17 illustrates a side view of another embodiment according to the invention.

The creation of a magnetic field that also generates electrical current results from the rotation of a disk-pack turbine 250E and at least one magnet disk 502 that is on an opposite side of the coil disk from the disk-pack turbine. In at least one example for the flux field generator, the coil disk 510 includes a plurality of coils 512 that are connected into multiple-phase sets. The disclosure that follows provides additional discussion of the flux field generator illustrated in FIGS. 12-15D; as an example, starting with the chamber 130E and proceeding down through the system. As with the previous examples for the flux field generator, the chamber 130E feeds the charging media to the disk-pack turbine 250E during operation and in at least one further example for the flux field generator the chamber 130E is omitted as depicted in FIGS. 16 and 17. In the flux field generators depicted in FIGS. 16 and 17, the intake occurs through the feed housing 126E (or inlet) and/or the periphery of the disk-pack turbine 250E. As mentioned previously, the intake of air is not a requirement for operation of the system in at least one embodiment and as such the feed housing 126E may be replaced by a shaft.

In at least one example for the flux field generator, the intake chamber 100E includes a cap 122E, a housing 120E connected to an intake port 132E, a lower housing 124E around a bearing 280E as illustrated, for example, in FIG. 14. In an alternative example for the flux field generator, one or more of the intake chamber components are integrally formed together. The housing 120E includes a vortex chamber 130E that includes a funnel section that tapers the wall inward from the intake ports 132E to an opening that is axially aligned with the feed chamber 136E. The funnel section in at least one flux field generator is formed by a wall that has sides that follow a long radial path in the vertical descending direction from a top to the feed chamber 136E (or other receiving section or expansion chamber). The funnel section assists in the formation of a vortex flow of charging medium downward into the system.

Below the main part of the chamber 130E is a tri-arm centering member 602 that holds in place the system in axial alignment with the drive shaft 314E. Although a tri-arm centering member is illustrated, the number of arms present may vary while accomplishing the centering function. Alternatively, the centering member is a plate. The vortex chamber 130E is in fluid communication with feed chamber 136E present in feed housing (or shaft or alignment shaft) 126E. The feed housing 126E passes through a collar housing 125E and a magnet plate 502, which is positioned below and in rotational engagement with the collar housing 125E. The feed housing 126E is in rotational engagement through bearings 282E with the collar housing 125E. The collar housing 125E is supported by bearing 282E that rides on the top of the lower feed housing 127E that is connected to the disk-pack turbine 250E. The feed chamber 136E opens up into an optional bell-shaped section 138E starting the expansion back out of the flow of the charging medium for receipt by the expansion chamber 252E. The intake housing components 120E, 122E, 124E together with the feed housing 138E in at least one embodiment together are the intake module 100E.

The magnet plate 502 includes a first array of six magnets (not shown) attached to or embedded in it that in the illustrated embodiment are held in place by bolts 5022 as illustrated, for example, in FIG. 14 or the magnets may be enclosed on the magnet plate with a cover. In at least one embodiment, the magnet plate 502 is a North-South magnet with the poles making up the magnet plate 502 where one half of the magnet is North and the other half is South. In a further embodiment, the poles (or magnetic regions/areas) are divided into alternating quarters, sixths, eighths, etc. In a still further embodiment, the poles are divided by small gaps of non-magnetic material. In another embodiment, the number of magnets is determined based on the number of phases and the number of coils such that the magnets of the same polarity pass over each of coils in each phase-set geometrically at the exact moment of passage. Alternatively, the magnet plate 502 includes (or is replaced by) a magnet ring with multiple polarity regions on it such as at least one of North-South alternating regions or North/South areas spaced apart. The magnet plate 502 in at least one flux field generator is electrically isolated from the feed housing 126E and the rest of system via, for example, electrically insulated/non-conducting bearings (not shown). The magnet plate 502 is able to freely rotate about the center axis of the disk-pack turbine 250E by way of the collar housing 125E made from, for example, aluminum which is bolted to the top of the upper round plate 502 and has two centrally located ball bearing assemblies, an upper bearing 282E and a lower bearing 283E, that slide over the central feed housing 126E, which serves as a support shaft. Alternatively, the bearings are incorporated into the magnet plate and the collar housing is omitted. The distance of separation between the magnet plate 502 and the top of the disk-pack turbine 250E is maintained, for example, by a mechanical set collar, shims, or spacers. In a further alternative embodiment, the magnet plate 502 rotates with the disk-pack turbine 250E.

During operation, the first array of magnets is in magnetic and/or flux communication with a plurality of coils 512 present on or in a stationary non-conductive disk (or platform) 510. The coil platform 510 is supported by support members 604 attached to the frame 600 in a position between the array of magnets and the disk-pack turbine 250E. The platform 510 in the illustrated flux field generator is electrically isolated from the rest of the system. In at least one example for the flux field generator, the platform 510 is manufactured from Plexiglas, plastic, phenolic or a similarly electrically inert material or carbon fiber.

A disk-pack turbine 250E is in rotational engagement with the feed chamber 138E. As with the other examples for the flux field generators, the disk-pack turbine 250E includes an expansion chamber 252E that is in fluid communication with the intake chamber 130E to establish a fluid pathway from the inlets to the at least one disk chamber 262E (two are illustrated in FIG. 14) in the disk-pack turbine 250E. The illustrated flux field generator includes two pairs of mated disks 260E sandwiched by a pair of rotors 264E, 266E where the disks 260E and the top rotor 264E each includes an opening passing therethrough and the bottom rotor 266E includes a rigid feature 2522E that together define the expansion chamber 252E. The disk chambers 262 in the illustrated flux field generator are present between the two disks in each mated pair with slightly paraboloid shaped surfaces (although they could be tapered or flat) being present between the neighboring disks, where the bottom disk of the top mated disk pair and the top disk of the bottom mated disk pair are the neighboring disks. In an alternative embodiment, these surfaces include one or more waveforms to provide an additional disk chamber. Each disk 260E of the mated pairs of disks is formed of complimentary non-magnetic materials by classification, such that the mated pair incorporating internal hyperbolic relational waveform geometries creates a disk that causes lines of magnetic flux to be looped into a field of powerful diamagnetic tori and repelled by the disk. An example of material to place between the mated disk pairs is phenolic cut into a ring shape to match the shape of the disks.

In the illustrated embodiment, the bottom rotor 266E provides the interface 2662E with the drive system 314E. In at least one example for the flux field generator, the rotors will be directly connected to the respective disks without electrically isolating the rotor from the nested disk. In another example for the flux field generator, the disks are electrically isolated from the rotor nesting the disk. The illustrated configuration provides for flexibility in changing disks 260E into and out of the disk-pack turbine 250E and/or rearranging the disks 260E.

A lower coil platform 510' may also be attached to the frame 600 with a plurality of support members 604. The lower platform 510' includes a second array of coils 512' adjacent and below the disk-pack turbine 250E. An optional second array of six magnets (not shown) present in magnet plate 504 are illustrated as being in rotational engagement of a drive shaft 314E that drives the rotation of the disk-pack turbine 250E, but the bottom magnet plate 504 in at least one embodiment is in free rotation about the drive shaft 314E using, for example, a bearing. The drive shaft 314E is driven by a motor, for example, either directly or via a mechanical or magnetic coupling. In an alternative embodiment, at least one magnet plate 502, 504 includes a magnet ring with multiple polarity regions on it such as at least one of North-South alternating regions or North/South areas spaced apart. Based on this disclosure, it should be appreciated that the magnet plate and coil disk examples can apply to both sets.

Each of the first array of coils 512 and the second array of coils 512' are interconnected to form a phased array such as a three or four phase arrangement with 9 and 12 coils, respectively. Although not illustrated, it should be understood based on this disclosure that there are a variety of ways to interconnect the coils to form multiple phases in wye or delta or even a single phase by connecting coils in series or parallel. As illustrated, for example, in FIG. 13, for each coil, there are a pair of junction points that are used to connect to common and positive and as illustrated the left box 5124 attaches to electrical power out while the right box 5126 connects to neutral/common.

In at least one implementation with a three phase arrangement, the coils for each phase are separated by 120 degrees with the magnets in the magnet plate spaced every 60 degrees around the magnet plate. The first array of magnets, the first array of coils 512, the second array of coils 512', and second array of magnets in at least one embodiment are arranged in a pattern substantially within the vertical circumference of the disk-pack turbine 250E, e.g., in circular patterns or staggered circular patterns of a substantially similar diameter as the disks 160E. In another example of a flux field generator, there are multiple coil platforms and/or coil arrays between the disk-pack turbine and the magnet plate.

The lower magnet plate 504 has a central hub 5042 bolted to it which also houses two ball bearing assemblies 282E, which are slid over the main spindle drive shaft 314E before the disk-pack turbine 250E is attached. This allows the lower magnet plate 504 to freely rotate about the center axis of the system and the distance of separation between the lower plate 504E and the disk-pack turbine 250E is maintained, for example, by a mechanical set collar, spacers, and/or shims or the height of the driveshaft 314E.

Suitable magnets for use in the flux field generator include, for example, rare earth and/or electromagnets. An example is using three inch disk type rare earth magnets rated at 140 pounds and in further embodiments magnets rated at 400 pounds are used; but based on this disclosure it should be understood that a variety of magnet strengths may be used. Depending on the construction used, all may be North magnets, South magnets, or a combination such as alternating magnets. In at least one embodiment, all metallic components, e.g., frame 600, chamber housing 120E, magnet plates 502, 504, are formed of non-magnetic or very low magnetic material with other components, e.g., bearings, spacers, tubing, etc., made of non-magnetic materials. The flux field generator, including frame 600 and lower platform 504, in at least one example are electrically grounded (Earth). In a further example, all movable components, particularly including chamber housing 120E and individual components of the disk-pack turbine 250E, are all electrically isolated by insulators such as non-conductive ceramic or phenolic bearings, and/or spacers.

In a further flux field generator, the magnet plate(s) is mechanically coupled to the waveform disks, for example, through the driveshaft. In a still further flux field generator, the magnet plate(s) is mechanically locked to rotate in a fixed relationship with the disk-pack turbine through for example the collar housing 125E illustrated in FIG. 13. This results in lower, but very stable output values. In a further alternative embodiment, the magnet plate(s) are connected to a separate drive system(s) that provides independent control of rotation speed from the rotation speed of the disk-pack turbine and in at least one further embodiment precise frequency control which can range from hertz to gigahertz as waveform structures and numbers of waveforms, other structures and waveform transitional waveform geometry have a direct correlation to outgoing output and operational frequencies. In a further example of a flux field generator, one set of coil platform and magnet plate are omitted from the illustrated embodiments of FIG. 12-17.

In use of the illustrated embodiment of FIGS. 12-14, the rotatable disk-pack turbine is driven by an external power source such as a battery bank, wall power, or a generator. In at least one embodiment, as the disk-pack turbine rotates a vacuum or suction is created in the flux field generator in at least one example. This vacuum draws a charging media into the intake chamber 130E via fluid inlets 132E. The intake chamber 130E transforms the drawn charging media into a vortex that further facilitates passing the charging media into the expansion chamber. As the charging media passes through the system, at least a portion of the through-flowing charging media is transformed into polar fluxes which are discharged or emanated from specific exit points within the system. This magnetic polar energy discharges at the center axis and periphery of the rotatable disk-pack turbine. For example, when the magnetic polar energy discharged at the periphery is a North polar flow, the magnetic energy discharged at the axis is a South polar flow. In this example, by introducing North-facing permanent magnets on magnet plates 502, 504 into the north-flowing flux, repulsive forces are realized. By placing the North-facing polar arrays at specific oblique angles, the rotatable disk-pack turbine is driven by the repelling polar flux. Utilizing only the polar drive force and ambient environmental energies and air as the charging media, the system is capable of being driven at a maximum allowed speed. Simultaneously, while generating polar flux discharges at the axis and periphery of the disk-pack turbine 250E, powerful, high torque, levitative diamagnetic fields manifest through the top and bottom surfaces of the disk-pack turbine. In at least one embodiment, the field strength of the diamagnetic fields is directly proportionate to the speed of rotation of the magnet arrays and magnet strength in relation to the rotating disk-pack turbine. Each of the mated pairs of rotatable waveform disks 160E is capable of producing very strong field energy at ambient temperatures while utilizing an extraordinarily small amount of input electrical energy. As an example, each of the mated pairs of rotatable waveform disks 160E is capable of producing well over one thousand (1,000) pounds of resistive, repulsive, levitative field energy. That is, the flux field generator is capable of repeatedly, sustainably and controllably producing a profoundly powerful diamagnetic field at ambient temperatures while utilizing relatively minimal input energy.

In a further flux field generator illustrated, for example, in FIG. 16, the chamber 120E above the tri-arm support member 602 is omitted and the expansion chamber pulls charging material from the atmosphere as opposed to through the intake chamber. In at least one example during operation, material is pulled from and discharged at the periphery of the disk-pack turbine 250E simultaneously. In a further embodiment, the intake chamber 120 is omitted and/or substantially sealed.

FIG. 17 illustrates an alternative flux field generator to that illustrated in FIG. 16. The illustrated embodiment includes a flux return 700 to restrain the magnetic fields and concentrate the magnetic flux created by the disk-pack turbine 250E and increase the flux density on the magnet plate 502 and coils 512. Examples of material that can be used for the flux return 700 include but are not limited to steel, iron, bismuth, and copper. In a further embodiment, steel and/or iron are used as part of the flux return 700. In at least one embodiment, other non-magnetic materials are used. In a further embodiment, the flux return includes a plurality of disks (or plates or laminated layers) where each disk is selected from the above materials resulting in a combination of material being used in any order. In at least one embodiment, the flux return 700 is sized to match the outer diameter of the outer edge of the magnets on the magnet plate 502. In a further embodiment, at least one disk of the flux return is attached to the disk-pack turbine. In a further embodiment, at least one disk of the flux return is spaced from the disk-pack turbine in a housing or on a shelf. In a further embodiment to the other embodiments in this paragraph, the flux return and/or containment includes a housing that shrouds the top and sides of the disk-pack turbine. Examples of shapes for the housing include bell, cylindrical, and conical. In at least one embodiment further to the embodiments and examples discussed in this paragraph, the flux return 700 is used with the non-power generating flux field generators and placed above the disk-pack turbine. In at least one further embodiment to the embodiments in this paragraph, the flux return is used also as a shield against the diamagnetic fields reaching into the interior of the vehicle such as, for example, the cargo area and/or the passenger area.

Figure 18:
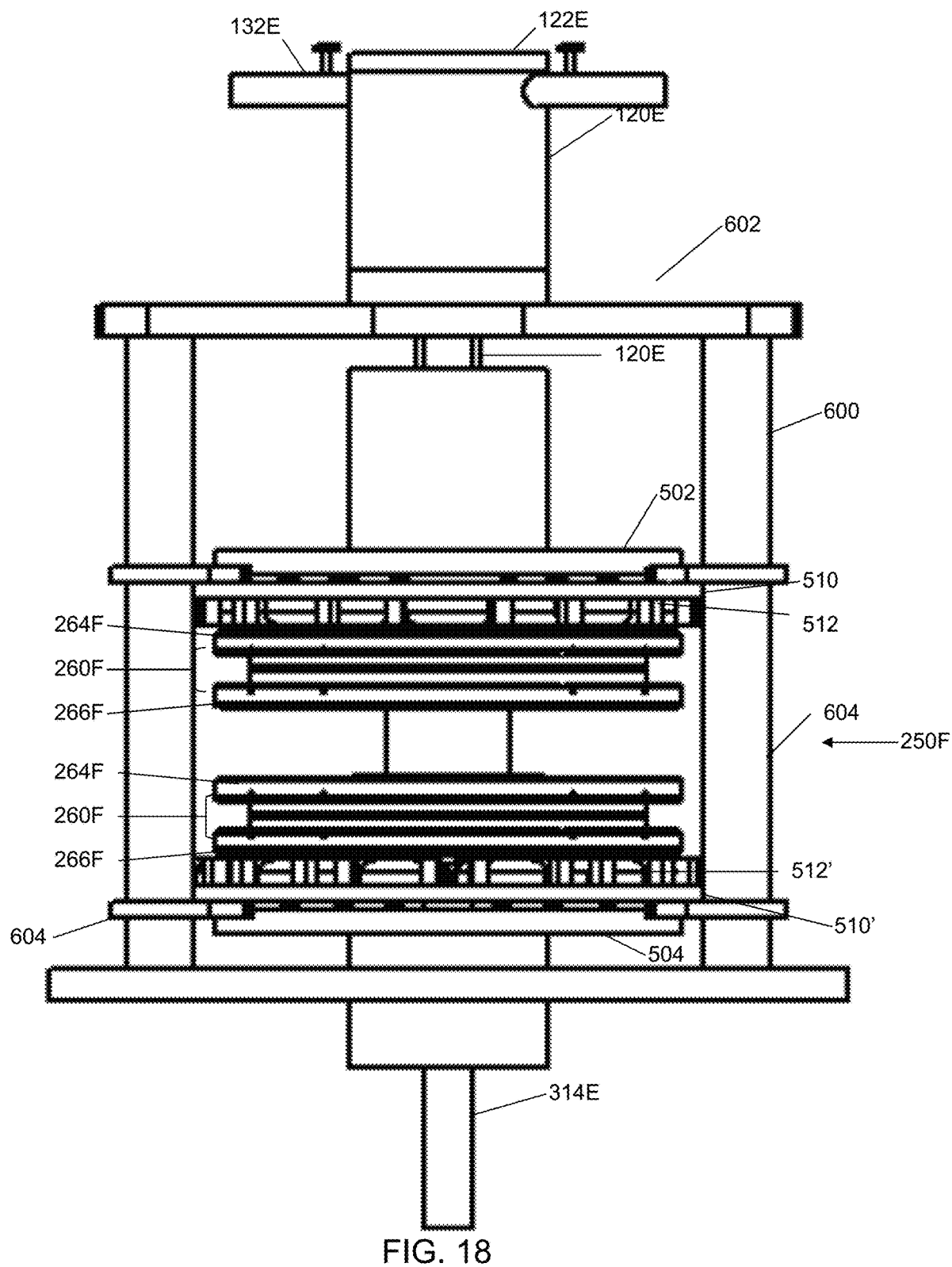
FIG. 18 illustrates a side view of another embodiment according to the invention.

Another example flux field generator of the present invention is illustrated in FIG. 18 and includes two disk-pack turbines 250F having a pair of rotors 264F, 266F sandwiching a pair of disks 260F, two sets of electrical coil arrays configured for the production of three-phase electrical power, and two bearing-mounted, free-floating, all North-facing magnetic arrays, along with various additional circuits, controls and devices. One difference with the previous flux field generators is that the disk-pack turbines 250F are spaced apart leaving an open area between them.

Figure 19A:
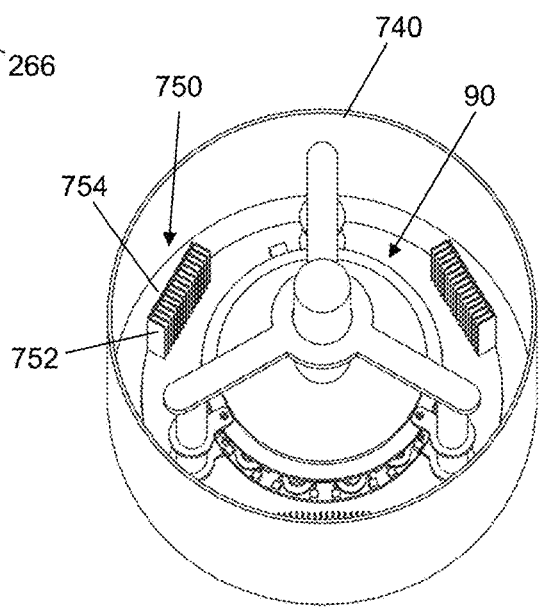
FIGS. 19A-19C illustrate alternative collector embodiments according to the invention.

In a further embodiment to the above embodiments, flux field generators include a collection/containment wall 740 (or dome) around a generation system 90 as illustrated in FIG. 19A to provide a means of collecting and harnessing for application and/or utilization the profound additional environmental electrical fields, voltages and dramatic currents/field amperage (for example, collectors 750) as well as in further embodiments the collection of any fluid components that manifest as a result of the power generation processes. The illustrated collectors 750 include a plurality of fins 752 that extend perpendicularly away from a base 754. In at least one embodiment, the collectors are electrically isolated from the wall (or other support structure). In a further embodiment, a containment area is defined by a cylindrical containment wall 740 (although the wall may take a variety of other forms) and a flux return (not illustrated in FIG. 19A). In a further embodiment, these components include steel and/or iron to restrain the produced magnetic fields within the defined containment area. The use of the containment components allow for passive generation of what is substantially identified as DC power from a non-power flux field generator where, for example, an external power source would stimulate the flow of field energy through the collectors.

In a further alternative embodiment, the wall and the frame are combined together where the wall provides the vertical and/or horizontal stabilization of the system. In a further embodiment, the frame extends up from the wall to engage with the centering support member, which in at least one embodiment is incorporated into (or as a part of) the flux return. In yet another embodiment, the wall is within a space defined by the frame.

During testing of the collector concept, six collectors were attached to the frame that included six vertical support members (or risers) around the prototype disk-pack turbine. The collectors provided DC power for use by DC electrical devices or for converting to AC power. Each collector was attached to an output of a coil or phase, which in at least one embodiment occurred through a diode orientated to provide current flow from the coil to the collector, to simulate the flow of field energy through each collector. The outputs of at least some of the collectors were attached to a respective DC electrical device that was connected to ground and in parallel with a capacitor enabling the flow of electrical energy to the respective DC electrical device, and the outputs were capable of powering the attached DC electrical devices. In at least one embodiment, the voltage values from the collectors are much higher than the AC voltage used to stimulate the collector based on voltage meter readings.

Figure 19B:
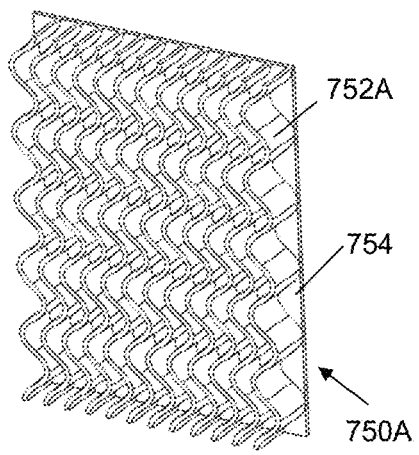
Figure 19C:
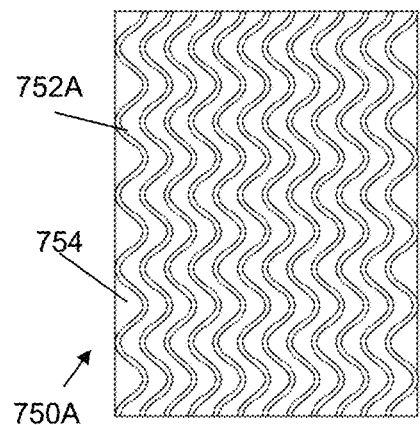

FIGS. 19B and 19C illustrate two views of an alternative collector 750A that includes sine waveforms, which in at least one embodiment are replaced with the hyperbolic waveforms discussed in this disclosure providing a smooth face as opposed to the illustrated fin pattern. The illustrated collector 750A includes a plurality of fins 752A attached to a base 754, which then is attached to a support or wall as discussed above in connection to collector 750.

Based on the above discussion regarding collectors, it should be understood that the number of collectors and the density of fins and/or waveforms present on individual collectors may vary from that illustrated in FIGS. 19A-19C. Furthermore, the fin and/or waveform pattern may have a variety of orientations on the base along with the base being placed in a variety of orientations while having the base be substantially parallel to a vertical plane passing through the center of the system when the system is in a vertical orientation. In a further alternative embodiment, the wall and/or collector is a retrofit component to waveform turbine (e.g., disk-pack turbine) systems such as those disclosed in this disclosure.

The nature of electricity generated is substantially different as compared to conventional power generation. The waveform disks in at least one embodiment are manufactured as nesting pairs. Each waveform disk pair may be of like or dissimilar materials, depending on design criteria, i.e., aluminum and aluminum, or, as example, aluminum, brass or copper. When a waveform disk pair is separated by a small distance/gap and are electrically isolated from one another by means of no mechanical contact and non-conducting isolation and assembly methods and elements like those described earlier, chambers formed between each disk pair provide for highly exotic flow paths, motion, screening currents, frequencies, pressure differentials, and many other actionary and reactionary fluid and energetic dynamics and novel electrical and polar phenomena. Immediately upon energizing the drive motor to set the disk-pack turbine rotor in motion, the inner disk hyperbolic geometries begin to interact with the magnetic fields provided by the rotatable Rare Earth magnet arrays, even though there are no magnetic materials incorporated into the manufacture of the disk-pack turbine. By the time the disk-pack turbine reaches the speed of approximately 60 RPM, diamagnetic field effects between the disk-pack turbine faces and magnet arrays are sufficient to establish a strong driving/impelling link between the disk-pack turbine and magnet array faces.

A variety of magnetic polar fluxes and electrical currents begin to manifest and dramatically increase in proportion to speed of rotation. Diamagnetism manifests as a profoundly strong force at the upper and lower rotor faces as primarily vertical influences which, through repellent diamagnetic fields, act to drive the magnet arrays while simultaneously generating a significant rotational torque component. It has been determined that these strong force diamagnetic fields can be transmitted through/passed through insulators to other metallic materials such as aluminum and brass. These diamagnetic fields, generated at ambient temperatures, are always repellant irrespective of magnet polarity. Although mechanically generated, these diamagnetic fields are, believed to be in fact, screening and/or eddy currents previously only recognized as a strong force associated with magnetic fields as they relate to superconductors operating at cryogenic temperatures. The system in at least one embodiment is configured to rotate on the horizontal plane, resulting in the most profound magnetic field effects manifesting and emanating at an oblique, though near right angle relative to the upper and lower rotor faces. The most profound electrical outputs in the system emanate from the periphery of the disk-pack turbine and are measurable as very high field amperages and atmospheric voltages. As an example, when attaching a hand held amp meter to any of the three structural aluminum risers of the built system illustrated, for example, in FIG. 12, it is common to observe amperages of over 150 amps per electrically isolated riser. Polar/magnetic fluxes are the primary fluid acting in this system configured for electrical power generation. An additional material acting within the system is atmospheric air. In certain implementations, allowing the intake, dissociation, and discharge of the elements within atmospheric air as well as exposure to ambient atmospheric energies increases the magnetic field effects and electrical power output potential by plus/minus 40%.

The diamagnetic fields utilized for electrical power generation make it possible to orient all magnets within the magnet arrays to North, South, or in a customary North/South alternating configuration. When all North or South facing magnets are configured in relation to the diamagnetic rotor fields, voltages and frequencies realized are extremely high. With all North or South magnet orientation the diamagnetism, which is both North and South magnetic loops, provides the opposite polarity for the generation of AC electricity. By configuring the system with alternating magnetic polarities and minor power output conditioning, it has been possible to practically divide the output values and bring the voltages and frequencies into useful ranges. As an example, measuring combined upper coil array only, output values of 900 volts at 60 HZ with a rotor speed of 1200 RPM are typical. A disadvantage to this configuration is that there is a reduction in overall electrical energy output. Based on research, it is believed the magnetic fluxes behave like gasses/fluids and can act as such. The addition/intake/dissociation of air and other ambient influences adds significantly to the process; however, with the presence of magnetic fields interacting with the hyperbolic waveform structures alone, it is believed that both exotic, magnetic phenomena as well as electricity are generated. It is believed it would be impossible to be generating these profound diamagnetic fields without also simultaneously generating corresponding electrical currents. As soon as a magnet, even handheld, is introduced above the disk surface and the diamagnetic repellent effect is felt, electrical current is being produced, thereby creating the diamagnetic phenomena. Based on the above, it is believed that the track/rail used in connection with the above flux field generators could have all North or South facing magnets or magnetic material and still provide levitation.

F. Examples of Waveform Disks

Figure 11A:
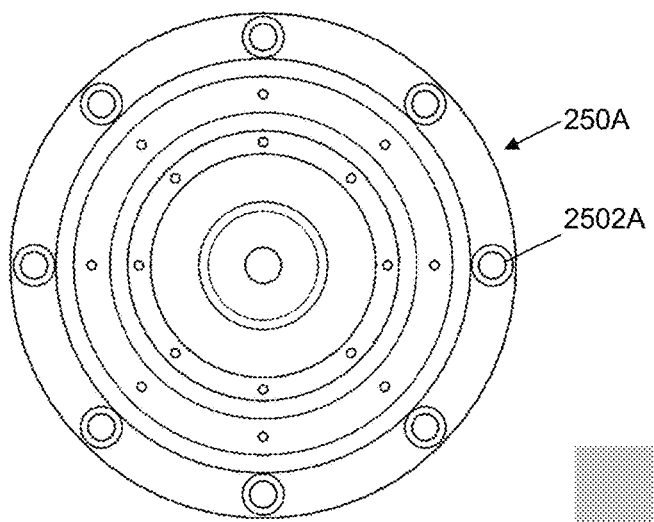
FIGS. 11A-11C illustrate another example disk-pack turbine according to the invention.
Figure 11B:
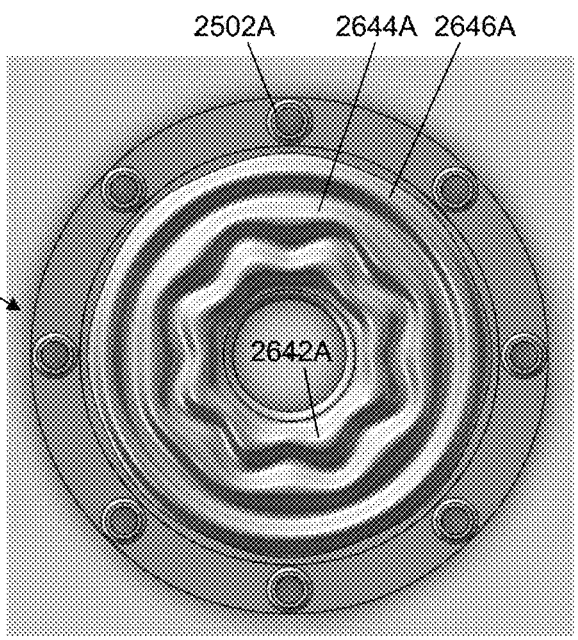
Figure 11C:
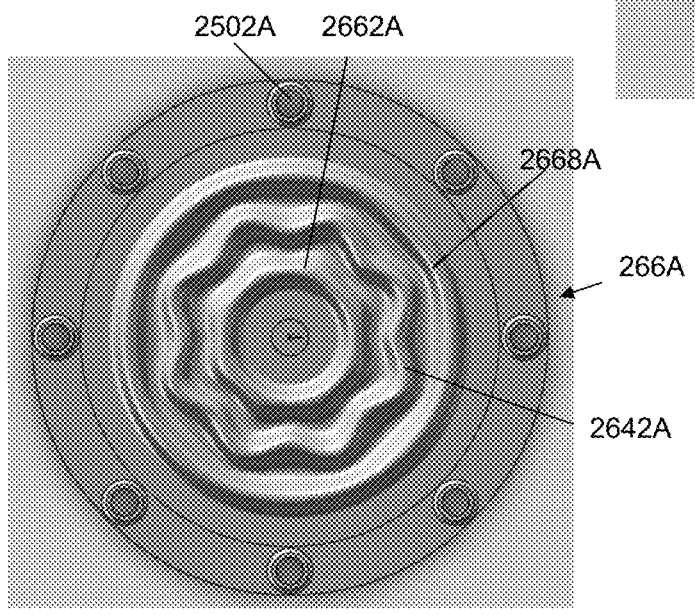

The previously described waveforms and the one illustrated in FIGS. 11B and 11C are examples of the possibilities for their structure. The waveform patterns increase the surface area in which the charging media and fields pass over and through during operation of the system. It is believed the increased surface area as alluded to earlier in this disclosure provides an area in which the environmental fields in the atmosphere are screened in such a way as to provide a magnetic field in the presence of a magnet. This is even true when the waveform disk is stationary and a magnet is passed over its surface (either the waveform side or back side of the waveform disk), and the ebbs and flow of the magnetic field track the waveform patterns on the disk, manifesting in at least one embodiment as strong, geometric eddy currents/geometric molasses.

FIGS. 11A-11C illustrates an example of a small biaxial configuration for the disk-pack turbine, which includes an upper rotor 264A and a lower rotor 266A, was sufficient to establish repeatable, verifiable dissociation achieved through hyperbolic rotary motion alone. FIG. 11A illustrates the top of the disk-pack turbine 250A, FIG. 11B illustrates the bottom face of the upper rotor 264A, and FIG. 11C illustrates the top face of the lower rotor 266A. The illustrated waveform pattern includes a sinusoidal ridge 2642A and a circular ridge 2646A. The lower rotor 266A includes a circular outer face ridge 2668A. Also, illustrated is an example of mounting holes 2502A for assembling the disk-pack turbine 250A. In an alternative embodiment, the wave patterns are switched between the upper rotor 264A and the bottom rotor 266A. Stoichiometric gas concentrations capable of sustaining flame were achieved through broad variations in systemic configuration and operating conditions.

The previously described waveforms and the one illustrated in FIGS. 11B and 11C are examples of the possibilities for their structure. The waveform patterns increase the surface area in which the charging media and fields pass over and through during operation of the system. It is believed the increased surface area as alluded to earlier in this disclosure provides an area in which the environmental fields in the atmosphere are screened in such a way as to provide a magnetic field in the presence of a magnet. This is even true when the waveform disk is stationary and a magnet is passed over its surface (either the waveform side or back side of the waveform disk), and the ebbs and flow of the magnetic field track the waveform patterns on the disk, manifesting in at least one embodiment as strong, geometric eddy currents/geometric molasses.

As discussed above, the waveform disks include a plurality of radii, grooves and ridges that in most examples are complimentary to each other when present on opposing surfaces. In at least one example, the height in the vertical axis and/or the depth measured along a radius of the disk chambers vary along a radius as illustrated, for example, in FIG. 15D. In at least one example, when a disk surface with the waveforms on it is viewed looking towards the waveforms, the waveforms take a variety of shapes that radiate from the opening that passes through (or the ridge feature on) the disk. In at least one example, the number of peaks for each level of waveforms progressing out from the center increases, which in a further example includes a multiplier selected from a range of 2 to 8 and more particularly in at least one embodiment is 2. In at least one embodiment, the number of peaks for each level of waveforms progressing out from the center stays the same or increases by a multiplier. In at least one embodiment, the multiplier is selected to amplify and compound internal and external energy interactions and production.

FIGS. 20A-20E illustrate a variety of additional waveform examples. The illustrated plates include two different waveforms. The first waveform is a circular waveform 2646G in the center and around the periphery. The second waveform 2642G is a biaxial, sinucircular, progressive waveform located between the two sets of circular waveforms. The illustrated disks mate together to form the disk channels 262G that extend out from the expansion chamber 252G discussed previously. Each of the disks includes a plurality of assembly flanges 2629G for mounting impellers between the disks.

Figure 20A:
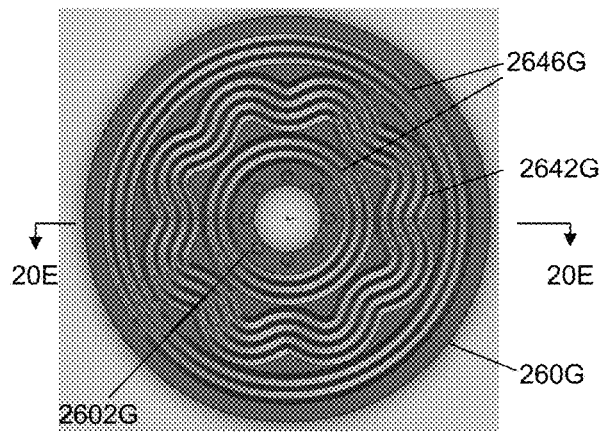
FIGS. 20A-20E illustrate another example disk-pack turbine according to the invention.
Figure 20B:
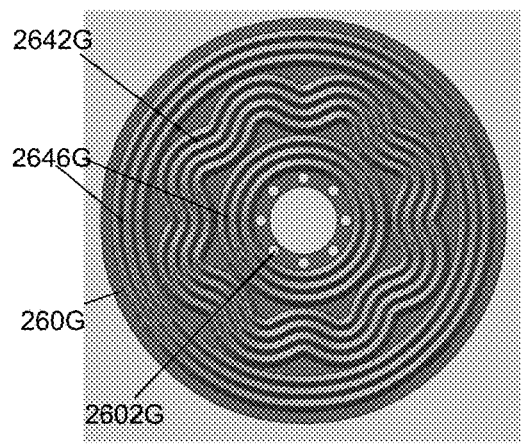
Figure 20C:
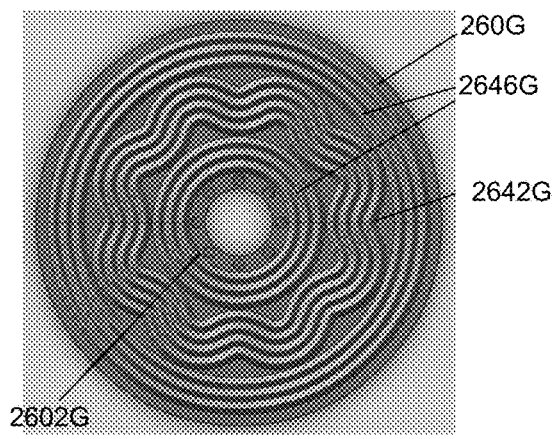
Figure 20D:
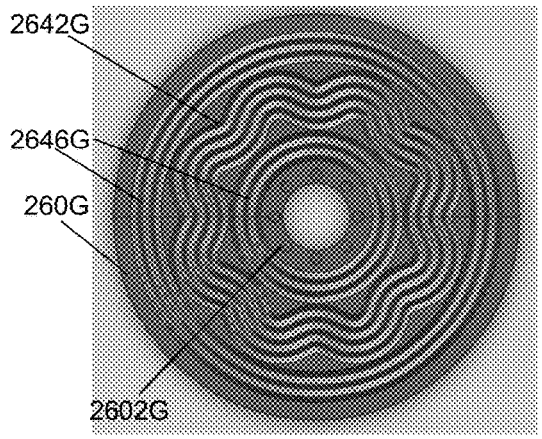
Figure 20E:
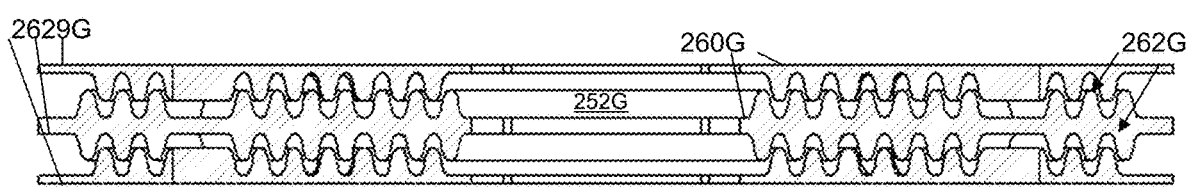

FIG. 20A illustrates an example combination of biaxial, sinucircular, progressive, and concentric sinusoidal progressive waveform geometry on a disk 260G according to the invention. FIGS. 20B and 20C illustrate respectively the opposing sides of the middle disk 260G. FIG. 20D illustrates the top surface of the bottom disk 260G. FIG. 20E illustrates how the three disks fit together to form the disk chambers 262G and the expansion chamber 252G of a disk-pack turbine. In an alternative embodiment, one or more of the circular waveforms is modified to include a plurality of biaxial segments.

Figure 21:
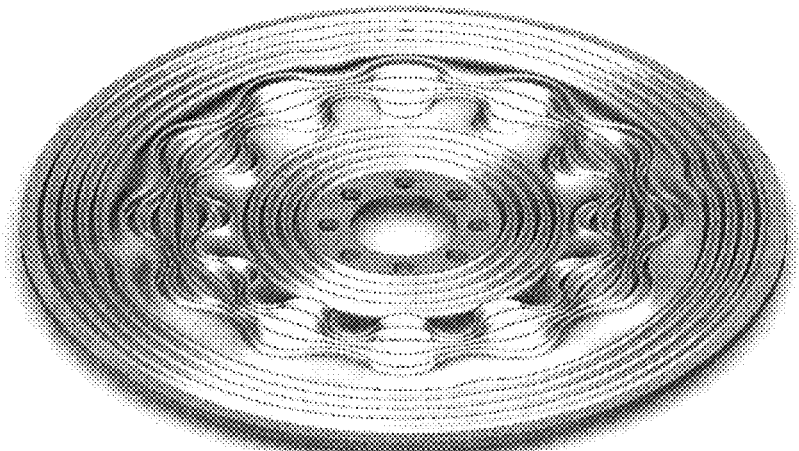
FIG. 21 illustrates a perspective view of another example disk according to the invention.

FIG. 21 illustrates an example of a center disk incorporating varied biaxial geometries between two sets of circular waveforms according to the invention.

Figure 22A:
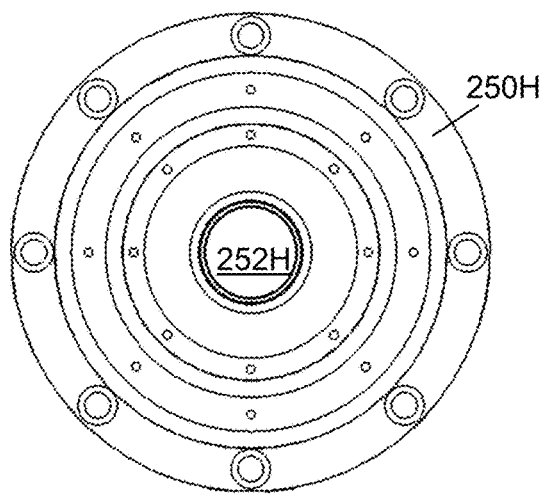
FIG. 22A-22D illustrate another example disk-pack turbine according to the invention.
Figure 22B:
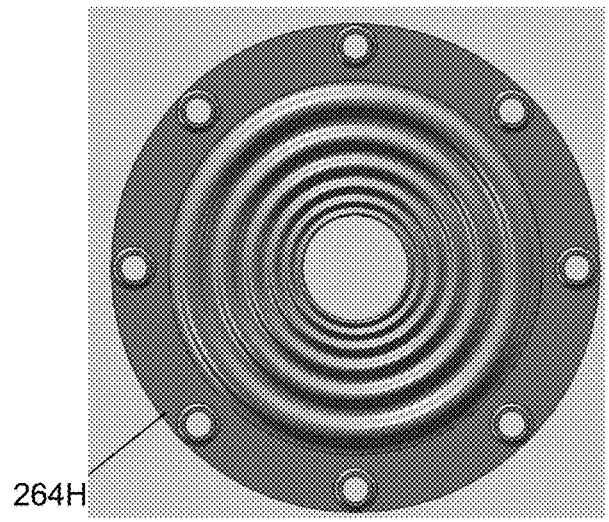
Figure 22C:
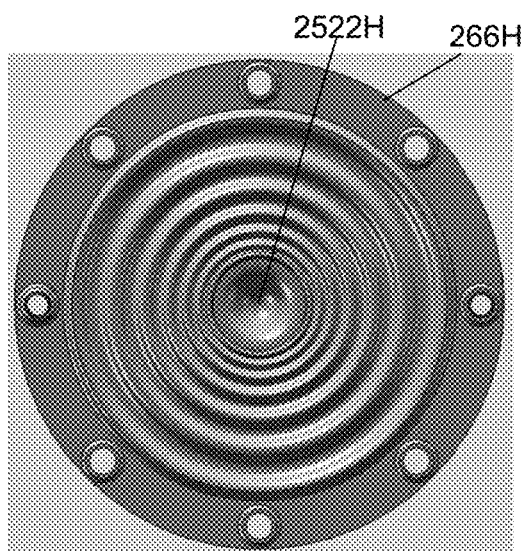
Figure 22D:
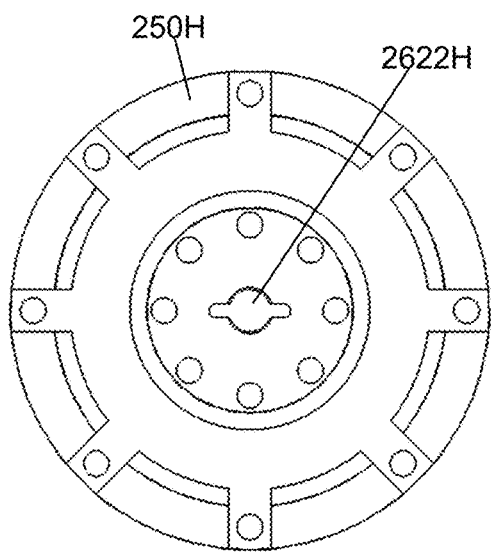

FIGS. 22A-22D illustrate a disk-pack turbine 250H with two disks. FIG. 22A illustrates the top of the disk-pack turbine 250H with an expansion chamber 252H. FIG. 21B illustrates the bottom surface of the top disk 264H. FIG. 22C illustrates the top surface of the bottom disk 266H including the concave feature 2522H that provides the bottom of the expansion chamber 252H in the disk-pack turbine 250H. FIG. 22D illustrates the bottom of the disk-pack turbine 250H including an example of a motor mount 2662H. The illustrated waveforms are circular, but as discussed previously a variety of waveforms including hyperbolic waveforms can be substituted for the illustrated circular waveforms.

FIG. 23 illustrates another example of a disk-pack turbine 250I with a top rotor 264I, a disk 260I, and a bottom rotor 266I. The top rotor 264I and the disk 260I are shown in cross-section with the plane taken through the middle of the components. FIG. 23 also illustrates an embodiment where the components are attached around the periphery of the opening that defines the expansion chamber 250I through mounting holes 2502I. Each of the waveform patterns on the top rotor 264I, the disk 260I, and the bottom rotor 266I includes two sets of circular waveforms 2646I and one set of hyperbolic waveforms 2642I.

In at least one example, the disk surfaces having waveforms present on it eliminates almost all right angles and flat surfaces from the surface such that the surface includes a continuously curved face.

In at least one example, at least one ridge includes a back channel formed into the outer side of the ridge that together with the complementary groove on the adjoining disk define an area having a vertical oval cross-section.

In at least one embodiment, one or more waveform disks used in a system include other surface features in addition to the waveforms.

Based on this disclosure, it should be appreciated that the described motor mounts could be modified to work with a rotor having an axially centered opening. The illustrated waveforms can be used on the different illustrated rotors and/or disks. In at least one embodiment, the waveforms are incorporated into one or more rotors instead of having the rotors nest a disk.

In a further embodiment, the orientation of the system is reversed where the motor and the driveshaft are above the disk pack turbine or there is a horizontal alignment. Based on this disclosure, it should be understood other orientations are possible with, for example, the axial center being angled relative to the horizon (or a horizontal plane).

G. Testing of a Prototype Flux Field Generator

At least one prototype has been built to test the operation of the system and to gather data regarding its operation. The flux field generators illustrated in FIGS. 12-18 include a three phase arrangement of nine coils, three coils per phase using 16 gauge copper magnet wire with 140 turns and six magnets (three North and three South magnets alternating with each other) above the disk-pack turbine and coils. On the bottom side of the disk-pack turbine there is a four phase arrangement of 12 coils, three coils per phase using 18 gauge copper magnet wire with 260 turns and six magnets. Based on this disclosure, it should be appreciated that the gauge and material of the wire and the number of turns and of coils can be modified and that the above descriptions are examples. The disk-pack turbine was assembled with two pairs of mated disks between the top rotor and the bottom rotor as illustrated, for example, in FIG. 16. In this particular configuration the two top waveform disks were made of aluminum and the bottom two waveform disks were made of brass. It has been found that alternating brass and aluminum disks, as opposed to nesting like disks results in significantly higher magnetic and electrical values being produced. In further testing when copper is used in place of brass, the voltages have stayed substantially equal, but a much higher current has been produced. After one testing session, it was discovered that the brass disks were not electrically isolated from each other and there was still excess electrical power generated compared to the power required to run the motor. The feed tube (or intake chamber) in at least one embodiment is made of brass and/or non-magnetic stainless steel and electrically isolated from the aluminum rotor face through use of a non-conductive isolation ring, which also is present between the two mated disk pairs. The system was connected to a motor via a belt.

When the motor was not running, and the disk-pack turbine was slowly rotated by hand, even at this very low speed, a diamagnetic field arose sufficient to engage the upper magnet plate (the magnet plate was not mechanically coupled), resulting in the production of enough electricity to cause a connected three-phase motor (2 HP, 230 V) to rotate as the disk-pack turbine was being turned by hand from the current produced in the coil arrays.

The lower magnet disk rotated with the disk-pack turbine while the upper magnet disk was magnetically coupled to the waveform disks. One way to illustrate the results will be to use classic power generation formulas. One of the greatest points of interest is that, even though there is, mathematically speaking, production of very high power readings as relates to watts, there is very little discernible heat generated through the process as a result of negligible resistance resulting from the diamagnetic fields, and this phenomenon extends to devices connected and driven by this electricity, such as multiple three-phase high voltage electric motors. An example is prior to starting the system, ambient temperatures for the induction coils and other associated devices were about 82° Fahrenheit. After running the system for in excess of one hour, the temperature rise was as little as two or three degrees and, at times, the temperature has been found to actually fall slightly. The temperature measured at the core of the waveform rotor when measured always has dropped a few degrees over time. The temperature of a three phase electric motor connected to the output will generally remain within one or two degrees of coil temperature. The three phases of the upper generating assembly were measured with each phase was producing approximately 200 volts at 875 RPM. Based on measurements, each of the three coil sets in the three-phase system measure out at 1.8 ohms. Divide 200 volts from one phase by 1.8 ohms equals about 111.11 Amps. The amperage of 111.11 Amps is multiplied by 200 volts multiplied by 1.732 (root mean square (RMS) factor for AC power) multiplied by cosine/Power Factor, which is usually around 1, divided by 1000 to obtain about 38.485 kW. The motor powering the system was drawing approximately 10.5 Amps with a line voltage of 230 volts, which yields 2,415 Watts being consumed by the motor to produce this output of about 38 kW. Similar phenomena have been observed when the AC power produced by the system is rectified into DC power and supplied to a DC load.

When the top magnet disk was locked with the waveform disks such that they rotate together as driven by the drive system, the process was repeated. The upper coil array produced about 540 Volts peak-to-peak between the three phases (or about 180 Volts per phase) and about 100 Amps for a power generation using the formula from the prior paragraph of about 31 kW. With regard to the lower generator, the math is actually quite different because there is a higher coil set resistance of approximately 3.7 Ohms per coil set of three coils (four phases). Each phase was producing 120 Volts peak-to-peak, which is using a simplified approach of voltage squared divided by resistance results in almost 3.9 kW per phase. Testing has found that diamagnetic energy will really start to rise at 1700 RPM and up as do the corresponding electrical outputs. The coils in these sets after further use have had their resistance lowered to negligible levels when read with an ohm meter.

Changing the material used for the intake chamber in the built system from D2 steel to brass improved the strength of the diamagnetic field and resulting power generation by approximately 30%.

The use of a flux return made from bismuth, copper, iron, or steel or a combination of these has resulted in a reorientation of the fields produced by the flux field generator. In at least one further embodiment, the flux return includes at least steel or iron.

For example, a one-eighth inch thick bismuth plate was placed above the disk-pack turbine on a Plexiglas shelf. The plate had sufficient diameter to cover the waveform geometries present in the disk-pack turbine. The push and torque forces felt when placing a magnet over the disk-pack turbine were redirected to the sides of the disk-pack turbine to increase the diamagnetic field to the periphery while substantially blocking the diamagnetic field above the bismuth plate. In addition, measured amperages at the bottom edge of the disk-pack turbine and in the environment around the disk-pack turbine increased. When the bismuth plate was attached with adhesive tape to the top of the disk-pack turbine, there were similar or better results obtained, but interestingly the bismuth was still and exhibited no signs of being impacted by the diamagnetic fields being redirected and/or shaped.

Another example is that when a copper plate was placed into the system above the disk-pack turbine, the field effect around the periphery and below the disk-pack turbine increased by approximately 25%. When a bismuth and/or steel plate were added, there was still an increase. Both the bismuth and copper plates when used individually cause an increase in the diamagnetic fields being projected laterally from the disk-pack turbine with a very good combination being to use a copper plate and a bismuth plate above the disk-pack turbine.

Figure 24:
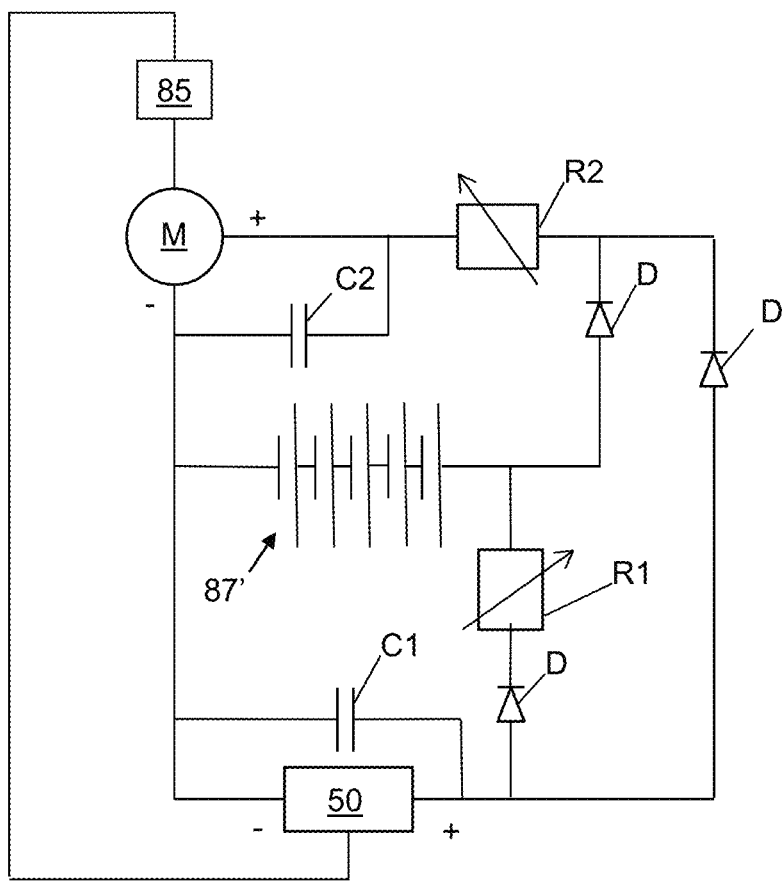
FIG. 24 illustrates a schematic of test flux field generator built to generate power.

FIG. 24 illustrates how power may be pulled from the flux field generator 85 with a coil array having three AC phases and a magnet plate and how the power may be conditioned for storage in a battery bank 87', which in turn is able to power the DC motor M that is used to rotate the disk-pack turbine in the flux field generator 85. In the built test bed, the motor M drove the disk-pack turbine through a mechanical linkage that included a belt. The illustrated example of the test bed includes a battery bank 87', which could be a capacitor bank instead or in addition, a DC motor M, a three phase rectifier 50 such as a full wave bridge rectifier in parallel with a capacitor C1, and a pair of rheostats R1, R2. The flux field generator 85 was configured to provide a three phase output to the rectifier 50 that than produced a DC signal that passed through the rheostat R1, which allowed for control of the voltage provided for battery charging, to the battery bank 87', which in the test bed included twelve 12-volt batteries connected in series and in another test bed included twelve sets of three 12-volt batteries in parallel to the other batteries in the set. Based on this disclosure, it should be appreciated that the battery bank could take a variety of configurations. The battery bank 87' was connected to the negative terminal of the motor M and the rectifier 50. The positive terminal of the battery bank 87' connected to the positive terminal of the motor M through a rheostat R2, which provided motor speed control. The various illustrated diodes D and capacitors C1, C2 are provided for illustration purposes and may be adjusted while still having the overall function of the circuit provided and in at least one embodiment capacitors are placed in series prior to the motor M and/or the battery bank 87'. The illustrated test bed was used to run the experiments resulting in the data shown in FIGS. 25A-25C and 26. In testing, the power into the battery bank 87' has been greater than the power used to run the system as demonstrated by the data in FIGS. 25A-25C.

Testing was performed using a disk-pack turbine with three pairs of waveform disks with copper separation plates placed between neighboring pairs of waveform disks produced the data contained in FIGS. 25A-25C. The waveform disks (top to bottom) were made from brass, aluminum, aluminum, aluminum, aluminum, and copper. The top waveform pair includes the presence of compression/decompression areas around the periphery of the waveform disk pair. The system also included a steel flux return above the magnet plate. The waveform disks were rotated using a 1.5 HP drive motor connected to a dial controller and a bank of batteries rated for 12 Volts and as such was not connected to wall power or any other power source.

There were three test runs performed with each having a different load being connected to the prototype system. For each test run, the temperature of the room and of a motor, which temperature was also recorded at the end of each test run, were taken at the start. In addition, the net standing voltage of the battery bank was measured using a multimeter. During each test run there was a first reading taken after the system had stabilized (first read) and an end reading proximate the end of the test run at 30 minutes (end read). The device motor measurements and output measurements were taken from power meters with one power meter on the input side of the drive motor and the other power meter on a rectified DC output that was used to recharge the battery and to run the system. All three phases were rectified through dual three phase, full-wave bridge rectifiers and all three phases were included to produce the DC output. The load measurements were taken from a power meter (e.g., connected 1 HP DC motor (rated at 1750 RPM) free-running) or calculated (e.g., the electrolytic cell). A common occurrence in each of the test runs was that the temperature of motors running on power from the system decreased and the voltage reading for the battery bank increased during the 30 minute test run. The system takes a few moments after it starts up and the load is present to stabilize itself, after which time the system produces voltages typically within a window of plus or minus 0.3 V variation over time. The drive motor temperatures were higher than ambient temperature in part using power originating from the wall. Typically, when the system is using power from the battery bank, which was previously charged by the system, the drive motor will stay within about 5 degrees Fahrenheit of ambient temperature.

The data for the first test run is depicted in FIG. 25A. The first test run used a 1 HP DC motor free-running as a load in addition to the recharging of the battery bank. Taking the watts readings for the outputs (output measurement, which represents voltage provided to the battery bank and the drive motor), the load measurement, and the drive motor measurements at the end, the differential in watts is 1339.1 W. Comparing the beginning and end voltage readings for the battery bank resulted in an increase of 0.3 V in the battery bank. A temperature reading of the battery bank at the end of the test run was 74.6 degrees Fahrenheit.

The data for the second test run is depicted in FIG. 25B. The load that was placed on the prototype system included an electrolytic cell and substantially continuous maintenance of a plasma arc over the 30 minute test run. The electrolytic cell included 584 ounces of water catalyzed with sulfuric acid to an adjusted pH of 3.00. The plasma arc was pulled between a positive copper electrode connected to the positive output of the system and an alligator clamp communicating electrically through the electrolytic fluid to the positive pole/static plate of the plasma arc puller, which was partially submerged in the electrolyte cell fluid. The negative pole/cable and alligator clamp were connected to an articulated arm of the plasma arc puller that was configured to pull vertical plasma arcs. The catalytic cell was activated once a continuous plasma arc was established, thus providing both an electrolytic cell and plasma arc system load to the system being tested. The selected electrodes for the plasma arc puller were carbon-steel positive and carbon-graphite at the negative. Taking the watts readings for the outputs (output measurement, which represents voltage provided to the battery bank and the drive motor), the load measurement, and the drive motor measurements at the end, the differential in watts is 548.6 W. Comparing the beginning and end voltage readings for the battery bank resulted in an increase of 0.6 V in the battery bank. A temperature reading of the battery bank at the end of the test run was 75 degrees Fahrenheit.

The data for the third test run is depicted in FIG. 25C. The load that was placed on the system was an electrolytic cell. The electrolytic cell for the second and third test runs had a similar structure, but the electrolytic cell had a pH of 5.31 for the third test run. Taking the watts readings for the outputs (output measurement, which represents voltage provided to the battery bank and the drive motor), the load measurement, and the drive motor measurements at the end, the differential in watts is 1281 W. Comparing the beginning and end voltage readings for the battery bank resulted in an increase of 0.8 V in the battery bank. A temperature reading of the battery bank at the end of the test run was 74.6 degrees Fahrenheit.

FIG. 26 illustrates data that was gathered from an experiment using two new BlackBerry PlayBooks as the testing objects. During each of the runs a video from YouTube was repeatedly played. The original run time was based on the Playbooks being charged using wall power to determine their length of run time. After the initial run time, PlayBook 1 was recharged using AC power generated by a prototype system illustrated in FIG. 24, while PlayBook 2 was recharged using power from a DC inverter connected to the rectified power in the system illustrated in FIG. 24. Each of the tests produced longer running times for the respective PlayBook, with run time for test 1 for PlayBook 1 being impacted by the circumstance that it was on standby overnight and used approximately 8% of the battery charge before the run time test was started.

In other battery testing that occurred with rechargeable AA batteries, it has been found that their run time have also been increased after they have been recharged using power generated by a prototype system.

In a battery test involving an iPod 4, the run time appears to be within about 30 minutes of original time. The difference was that there was a reduction in charging time of about 3.5 hours (e.g., about 9 hours down to about 5.5 hours) when the iPod after having multiple charging cycles using power generated by a prototype system was returned to charging from wall power.

Another occurrence that has been noticed antidotally is that the electronics seem to operate and charge cooler after being exposed to power generated by a test system.

H. Discussion Regarding Diamagnetism

Diamagnetism has generally only been known to exist as a strong force from the screening currents that occur in opposition to load/current within superconductors operating at super low cryogenic temperatures, i.e., 0 degrees Kelvin (0 K) or −273 degrees Celsius (−273 C.). When a superconductor-generated diamagnetic field is approached by a magnetic field (irrespective of polar orientation) a resistive/repulsive force resists the magnetic field with ever-increasing repulsive/resistive force as distance of separation decreases. The superconductor's resistive force is known to rise, in general, in a direct one-to-one ratio relative to the magnetic force applied. A 100 pound magnet can expect 100 pounds of diamagnetic resistance. A logical assumption would lead one to believe that this diamagnetic force, acting upon a superconductor in this way, would result in increases in systemic resistance and net losses in efficiency. The counter-intuitive reality is that this interaction results in a zero net loss to the system.

As described above, diamagnetism manifests as a strong force in superconductors due to the screening currents that occur at cryogenic temperatures. As with superconductors, the system of the present invention in at least one embodiment, utilizes screening currents working in concert with internal oppositional currents, flows, counter-flows, reciprocating flows and pressures generated by hyperbolic waveforms present on the rotatable waveform disks. These forces in combination with specific metallic materials, material relationships, component isolation technologies, and charging media as discussed in the example embodiments above manifest as profoundly powerful diamagnetic fields at the bottom and top surfaces of the rotatable disk-pack turbine at ambient temperatures. The diamagnetic waveform disks are fabricated from non-magnetic materials that are incapable of maintaining/retaining a residual electric field in the absence of an applied charge. The diamagnetic fields created by the rotatable waveform disks are a direct product of the waveform motions, interaction with environmental matter and energies, and a modest amount of through-flowing and centripetal ambient air.

The diamagnetic fields generated by the waveform disks can be utilized as a substitute for the North or South magnetic poles of permanent magnets for the purpose of generating electricity. However, unlike the North/South lines of force exhibited by common magnetic fields, diamagnetic fields manifest as North/South loops or tori that spin around their own central axis. This distinction results in the diamagnetic field not being a respecter of magnetic polarity and always repellent. The magnetic repellency allows one pole of the North/South alternating magnetic fields to be substituted with the diamagnetic field generated by the waveform disks. In use, the upper array of magnets and the lower array of magnets float freely and are driven by the diamagnetic levitative rotational torque. As the all North-facing rare earth magnets cut a circular right-angle path over the upper array of coils, and lower array of coils, electrical power is generated.

Systems utilizing this arrangement for electrical power generation, in at least one example of the flux field generator, have realized a multiplication in the production of voltage and current as compared to an electrical power generation arrangement utilizing traditional North to South pole fluxuations. Further, power input required to run the systems are extremely low while power production is accomplished with minimal rise in heat or resistance, e.g., systems temperatures of less than five degrees over ambient temperatures. Also, when a coil or circuit is placed into the diamagnetic field, the resistance drops to near 0 Ohms with actual repeatable readings being about 0.01.

Further, in at least one example flux field generator, the flux field generator is capable of producing at very low operational speeds powerful diamagnetic fields that are capable of functioning as an invisible coupling between a rotating waveform disk and a rotatable magnetic array. The flux field generator drive side may be either the magnetic array side or the diamagnetic disk side. The magnets may move over the internal waveform geometries, thereby causing the fields to arise, or vise-versa. Actual power/drive ratios are established via progressive waveform amplitude and waveform iterations. The magnetic drive array will allow for the magnets to be dynamically/mechanically progressed toward periphery as systemic momentum increases and power requirements decrease. Conversely, when loads increase, the systemic driving magnets will migrate toward higher torque/lower speed producing geometries.

It is believe that the presence of the diamagnetic fields being produced by the rotating waveforms lowers the resistance in the coils to explain the lack of significant temperature change that occurs during operation of the system. This belief is supported by the lowering of the resistance present in the coils after removal from the system when measured by an ohm meter. Furthermore, the failure of the produced fields to respect polarity is further support for this belief. The generation of fields is done at substantially ambient temperatures. Additionally, overtime the coils assist in generating higher current levels as their resistance disappears.

I. Conclusion

While the invention has been described with reference to certain embodiments, numerous changes, alterations and modifications to the described embodiments are possible without departing from the spirit and scope of the invention, as defined in the appended claims and equivalents thereof. The number, location, and configuration of disks and/or rotors described above and illustrated are examples and for illustration only. Further, the terms disks and rotors are used interchangeably throughout the detailed description without departing from the invention.

The example and alternative embodiments described above may be combined in a variety of ways with each other without departing from the invention.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

The foregoing description describes different components of embodiments being "connected" to other components. These connections include physical connections, fluid connections, magnetic connections, flux connections, and other types of connections capable of transmitting and sensing physical phenomena between the components.

The foregoing description describes different components of embodiments being "in fluid communication" to other components. "In fluid communication" includes the ability for fluid to travel from one component/chamber to another component/chamber.

Although the present invention has been described in terms of particular embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the embodiments described above can be configured without departing from the scope and spirit of the invention. Therefore, it is to be understood that, within the scope of the appended claims, the invention may be practiced other than as specifically described herein.

The invention claimed is:

1. A collector plate for use in a magnetic field and/or flux field generator, the collector plate comprising:
    a base configured to be parallel to a plane passing through an axial center of the generator when installed in the generator;
    a collection structure extending from said base and configured to face the generator, said collection structure including a plurality of sine waveform fins or hyperbolic waveforms; and
    electrical connectors connected to said collection structure.

2. The collector plate according to claim 1, wherein at least one of said base and said collection structure includes at least one of the following materials individually or in combination as alloys or multiple layers: copper, bismuth, steel, silver, nickel, gold, platinum, carbon-fiber structures, and mercury.

3. The collector plate according to claim 1, wherein said sine waveform fins or hyperbolic waveforms have a vertical orientation.

4. A system comprising:
    a plurality of collector plates according to claim 1; and
    a collection structure configured to fit around the magnetic field and/or flux field generator, said collection structure is connected to said collector plates.

5. The system according to claim 4, wherein said collection structure is integrally formed with a frame supporting the magnetic field and/or flux field generator.

6. The system according to claim 5, wherein said collection structure includes vertical risers and a centering member extending in from said vertical risers to an axial center of said collection structure.

7. The system according to claim 4, wherein said collection structure includes a wall and/or a dome, said collection structure includes steel and/or iron.

8. The system according to claim 4, wherein said collection structure includes a containment wall and a flux return over the top of said wall to define a cavity in which a majority of the magnetic field and/or flux field generator sits.

9. The system according to claim 4, wherein said electrical connectors include
    a plurality of diodes, each diode attached to one respective collector plate and oriented to provide current to said attached collector plate;
    an output for each collector plate; and
    a capacitor connected in parallel to each collector plate, and wherein said collector plates are electrically isolated from said collection structure.

10. The collector plate according to claim 1, wherein said electrical connectors include
a plurality of diodes, each diode attached to one respective collector plate and oriented to provide current to said attached collector plate;
an output for each collector plate; and
a capacitor connected in parallel to each collector plate.

11. A collector plate for use with a disk-pack turbine system, the collector plate comprising:
a base configured to be parallel to a plane passing through an axial center of the disk-pack turbine when installed around the disk-pack turbine;
a collection structure extending from said base and configured to be between said base and the disk-pack turbine system, said collection structure including a plurality of fins; and
electrical connectors connected to said collection structure.

12. The collector plate according to claim 11, wherein at least one of said base and said collection structure includes at least one of the following materials individually or in combination as alloys or multiple layers: copper, bismuth, steel, silver, nickel, gold, platinum, carbon-fiber structures, and mercury.

13. The collector plate according to claim 11, wherein said fins include sine waveform fins.

14. The collector plate according to claim 11, wherein said fins include hyperbolic waveforms.

15. The collector plate according to claim 11, wherein said electrical connectors include
a plurality of diodes, each diode attached to one respective collector plate and oriented to provide current to said attached collector plate;
an output for each collector plate; and
a capacitor connected in parallel to each collector plate.

16. A system comprising:
at least three collector plates according to claim 11; and
a collection structure configured to fit around the disk-pack turbine system, said collection structure is connected to said collector plates.

17. The system according to claim 16, wherein said collection structure is integrally formed with a frame supporting the disk-pack turbine system.

18. The system according to claim 17, wherein said collection structure includes vertical risers and a centering member extending in from said vertical risers to an axial center of said collection structure.

19. The system according to claim 16, wherein said collection structure includes a containment wall and a flux return over the top of said wall to define a cavity in which at least a majority of the disk-pack turbine system sits.

20. The system according to claim 16, wherein said electrical connectors include
a plurality of diodes, each diode attached to one respective collector plate and oriented to provide current to said attached collector plate;
an output for each collector plate; and
a capacitor connected in parallel to each collector plate, and
wherein said collector plates are electrically isolated from said collection structure.

* * * * *